United States Patent
Dupoy et al.

(10) Patent No.: US 12,072,282 B2
(45) Date of Patent: Aug. 27, 2024

(54) METHOD AND DEVICE FOR ANALYSING A SAMPLE, IMPLEMENTING A RESONANT SUPPORT

(71) Applicants: CENTRE NATIONAL DE LA RECHERCHE SCIENTIFIQUE, Paris (FR); CPE LYON FORMATION CONTINUE ET RECHERCHE, Villeurbanne (FR);

(Continued)

(72) Inventors: Mathieu Dupoy, Grenoble (FR); Taha Benyattou, Vourles (FR); Lotfi Berguiga, Lyons (FR); Jean-Marc Fedeli, Grenoble (FR); Maryse Fournier, Grenoble (FR); Nicolas Gaignebet, La Tour d'Aigues (FR); Cecile Jamois, Caluire (FR); Patrick Pouteau, Meylan (FR)

(73) Assignees: CENTRE NATIONAL DE LA RECHERCHE SCIENTIFIQUE, Paris (FR); CPE LYON FORMATION CONTINUE ET RECHERCHE, Villeurbanne (FR); ECOLE CENTRALE DE LYON, Ecully (FR); INSTITUT NATIONAL DES SCIENCES APPLIQUEES DE LYON, Villeurbanne (FR); UNIVESITE CLAUDE BERNARD LYON 1, Villeurbanne (FR); AVALUN, Grenoble (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 331 days.

(21) Appl. No.: 17/616,908

(22) PCT Filed: Jun. 4, 2020

(86) PCT No.: PCT/EP2020/065484
§ 371 (c)(1),
(2) Date: Dec. 6, 2021

(87) PCT Pub. No.: WO2020/245272
PCT Pub. Date: Dec. 10, 2020

(65) Prior Publication Data
US 2022/0317028 A1    Oct. 6, 2022

(30) Foreign Application Priority Data

Jun. 7, 2019 (FR) ..................................... 1906132

(51) Int. Cl.
*G01N 21/31* (2006.01)
*G01N 21/43* (2006.01)
*G01N 21/59* (2006.01)

(52) U.S. Cl.
CPC ..... *G01N 21/31* (2013.01); *G01N 2021/3137* (2013.01); *G01N 2021/438* (2013.01); *G01N 2021/5957* (2013.01)

(58) Field of Classification Search
CPC ........... G01N 21/31; G01N 2201/3137; G01N 2201/438; G01N 2201/5957
See application file for complete search history.

(56) References Cited

U.S. PATENT DOCUMENTS

| 2004/0155309 A1 | 8/2004 | Sorin et al. |
| 2008/0278722 A1* | 11/2008 | Cunningham ....... G01N 21/648 356/317 |
| 2017/0082975 A1 | 3/2017 | Gliere et al. |

FOREIGN PATENT DOCUMENTS

EP    3 147 646 A1    3/2017

OTHER PUBLICATIONS

International Search Report issued on Sep. 3, 2020 in PCT/EP2020/065484 filed on Jun. 4, 2020, 3 pages.

(Continued)

*Primary Examiner* — Jamil Ahmed
(74) *Attorney, Agent, or Firm* — Oblon, McClelland, Maier & Neustadt, L.L.P.

(57) ABSTRACT

A method for analysing a sample uses a resonant support having a surface on which a plurality of separated photonic (Continued)

crystals extends. At least two crystals are configured to capture the same analyte. A resonance wavelength associated with each crystal varies with an amount of analyte in contact with the crystal. The wavelengths define a resonance spectral band between 200-1500 nm. The transmission/reflection of the light is maximum at an associated resonance wavelength. The method includes: illuminating the support in the resonance spectral band, the intensity of the lamination being variable in band; acquiring a measurement image using an image sensor, the image having different regions-of-interest each optically coupled to a photonic crystal; using a reference image representative of an image acquired by the image sensor, when the support is illuminated in the resonance spectral band in a reference configuration; and comparing the measurement image with the reference image.

23 Claims, 17 Drawing Sheets

(71) Applicants: ECOLE CENTRALE DE LYON, Ecully (FR); INSTITUT NATIONAL DES SCIENCES APPLIQUEES DE LYON, Villeurbanne (FR); UNIVERSITE CLAUDE BERNARD LYON 1, Villeurbanne (FR); AVALUN, Grenoble (FR); COMMISSARIAT A L'ENERGIE ATOMIQUE ET AUX ENERGIES ALTERNATIVES, Paris (FR)

(56) References Cited

OTHER PUBLICATIONS

Bougot-Robin, K. et al., "A multispectral resonant waveguide nanopatterned chip for robust oil quality monitoring," Sensors and Actuators B: Chemical, vol. 216, 2015, pp. 221-228, XP029243348.
Cheng, F. et al., "Tuning asymmetry parameter of Fano resonance of spoof surface plasmons by modes coupling," Applied Physics Letters, vol. 100, 131110, 2012, pp. 131110-1-131110-4, XP012155359.
Nazirizadeh, Y. et al., "Low-cost label-free biosensors using photonic crystals embedded between crossed polarizers," Optics Express, vol. 18, No. 18, 2010, pp. 19120-19128, XP002635685.

* cited by examiner

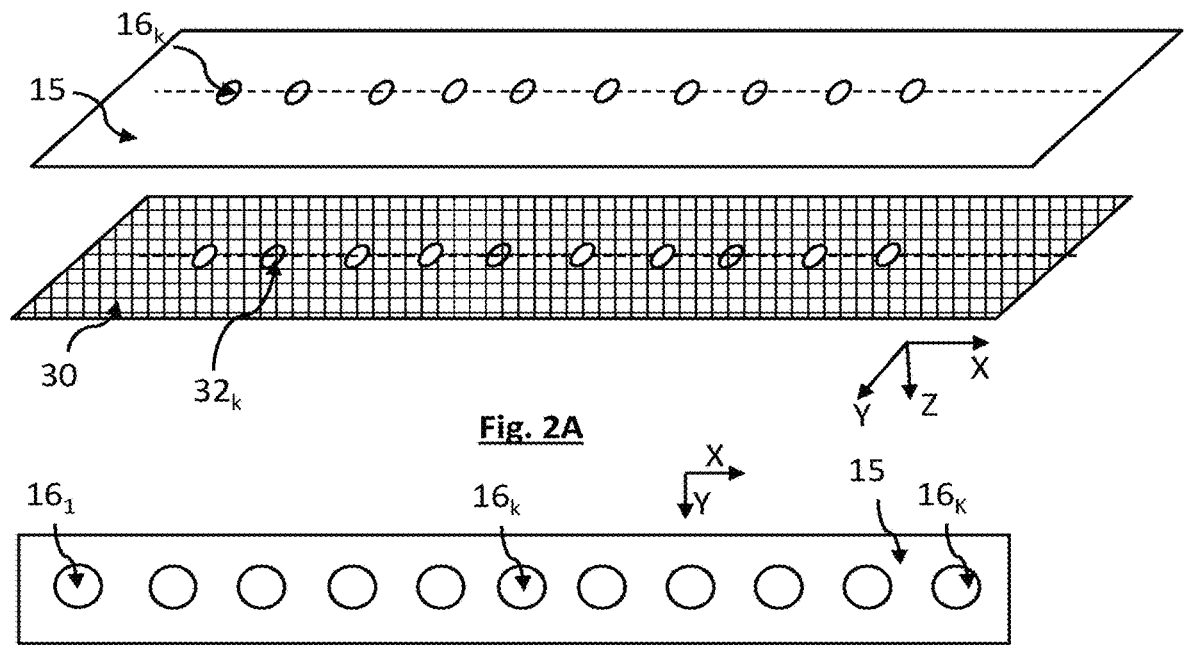
Fig. 2A
Fig. 2B
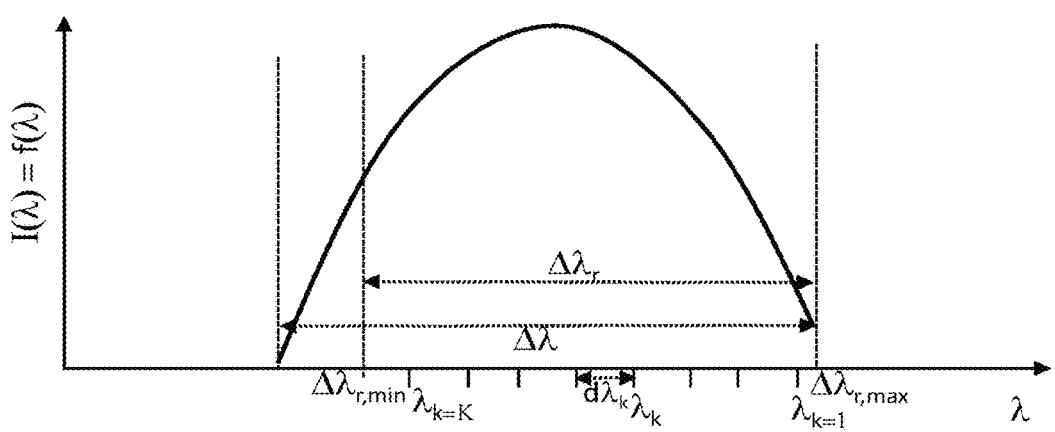
Fig. 2C

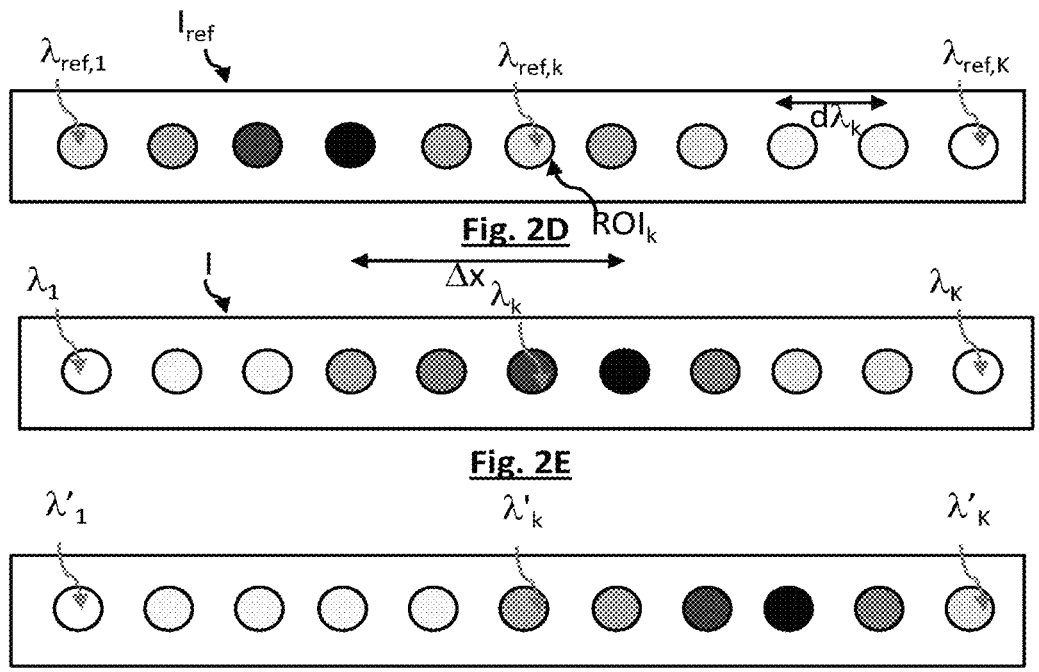
Fig. 2D
Fig. 2E
Fig. 2F
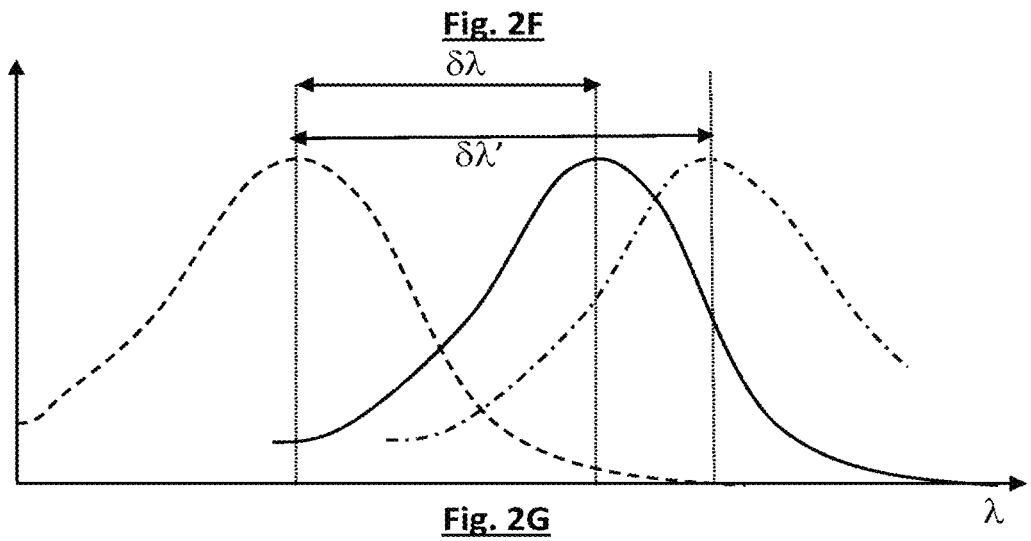
Fig. 2G
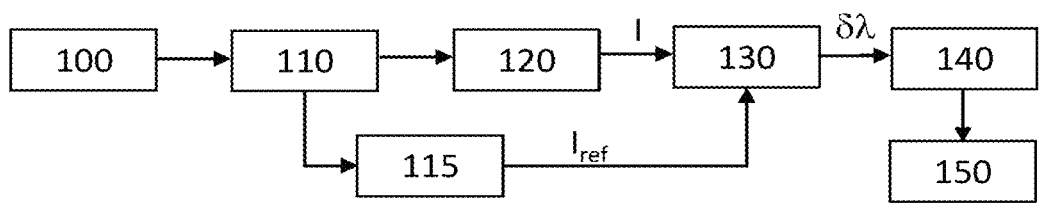
Fig. 2H

METHOD AND DEVICE FOR ANALYSING A SAMPLE, IMPLEMENTING A RESONANT SUPPORT

TECHNICAL FIELD

The technical field of the invention is the analysis of a sample, the sample being deposited on a holder comprising photonic crystals the spectral properties of which in transmission or reflection comprise a resonant wavelength, the latter undergoing a variation under the effect of the presence of an analyte.

PRIOR ART

Detection of the presence of an analyte, and determination of its concentration in a sample, are operations conventionally carried out via chemical assays or destructive biological methods. Many laboratory methods exist, among which, in the field of biology, amplification of sequences by PCR (polymerase chain reaction) or genome-sequencing techniques. These techniques are now well-established, but require expensive hardware and qualified personnel.

Analyzing methods, employing optical techniques, have been developed, these for example being based on samples placed very close to image sensors, for example via lensless imaging. In patent U.S. Pat. No. 13,905,727, a method for quantifying an analyte via detection of clusters formed in a sample is described. In WO2016151249, or in WO2018060589, use of holographic-propagation algorithms to identify particles present in a sample is described. The document US20170082975 describes a device comprising a substrate intended to be applied so as to make contact with a sample to be analyzed. The substrate comprises one- or two-dimensional photonic crystals, allowing particles present in a sample to be observed.

The publication Cetin "Handheld high-throughput plasmonic biosensor using computational on-chip imaging" describes a device for analyzing a sample that is intended to assist with medical diagnosis. The device comprises a sample holder that is able to capture analytes, and that is conducive to the generation of surface plasmon resonance. An image sensor, which is placed in a lensless imaging configuration, allows a diffraction pattern representative of the plasmonic structures formed in the holder to be acquired. Application of a holographic-reconstruction algorithm allows the analytes captured by the holder to be identified, and their concentration to be determined. Such a method requires holographic-reconstruction algorithms, which may sometimes be complex to implement, and which may be adversely affected by substantial reconstruction noise, to be applied.

Patent application WO02/059602 describes a device for analyzing a sample, comprising a nanostructured surface, which surface is configured to reflect light toward a sensor. The nanostructured surface is configured to capture an analyte. Depending on the wavelength of the reflected light, it is possible to determine the type of analyte bound to the capturing surface. A spectrometer allows the wavelength of the reflected light to be detected, this giving an indication as to whether or not the analyte is present on the capturing surface.

The publication Bougot-Robin K et al. "A multispectral resonant waveguide nanopatterned chip for robust oil quality monitoring", Sensors and Actuators B: Chemical, vol. 216, 2015-04-15, pp 221-228, describes use of photonic crystals to analyze oil.

The document US2004/155309 describes use of metal structures that induce a plasmon resonance, to analyze samples.

The document Cheng F. et al. "Tuning asymmetry parameter of Fano resonance of spoof surface plasmons by modes coupling", Applied Physics Letters, vol 100, n° 3, 2012-03-26 describes metal structures that induce a plasmon resonance. Each structure consists of two patterns that are offset from each other, the offset being set.

The inventors have designed an analyzing device that is easy to use, that does not require complex instrumentation, such as a spectrometer. The device allows a rapid analysis as regards the presence and an amount of analytes present in a sample.

SUMMARY OF THE INVENTION

A first subject of the invention is a method for analyzing a sample, the sample lying on a resonant holder, the resonant holder comprising a surface on which lie a plurality of photonic crystals, which are separate from one another, the photonic crystals being such that:
  at least two photonic crystals are configured to make contact with the same analyte, said photonic crystals thus addressing the analyte;
  one resonant wavelength is associated with each photonic crystal addressing the analyte, the resonant wavelength varying as a function of an amount of analyte in contact with each photonic crystal, the resonant wavelengths of the photonic crystals defining a spectral band of resonance, lying between 200 nm and 1500 nm;
  the transmission or reflection of light by each photonic crystal addressing the analyte is maximum at the resonant wavelength associated with it;
the method comprising the following steps:
  a) illuminating the resonant holder with a light source, in a spectral band of illumination that at least partially covers the spectral band of resonance, such that a plurality of photonic crystals addressing the analyte are simultaneously illuminated, the illumination being such that the illumination intensity is variable, in the spectral band of resonance, according to a spectral illumination function;
  b) acquiring, with an image sensor, an image of the resonant holder, which image is referred to as the measurement image, the image comprising different regions of interest, each region of interest being optically coupled to one photonic crystal addressing the analyte, such that each region of interest represents an intensity transmitted or reflected by each photonic crystal, while the resonant holder is illuminated;
  c) taking into account a reference image, the reference image being representative of an image acquired by the image sensor, when the resonant holder is illuminated in the spectral band of illumination, in a reference configuration, for example in the absence of analyte;
  d) comparing the measurement image, acquired in step b), with the reference image, taken into account in step c);
  e) based on the comparison, determining whether the analyte is present in the sample.

Two different regions of interest are optically coupled to two different photonic crystals. Each region of interest of the image corresponds to one pixel or one group of pixels of the image sensor, the group of pixels being optically coupled to one photonic crystal.

By in the absence of analyte, what is meant is in the absence of analyte in contact with the resonant holder.

According to one variant, the reference image is representative of an image acquired by the image sensor, when the resonant holder is illuminated in the spectral band of illumination, in a reference configuration, in the presence of a known amount of analyte in the sample.

According to one embodiment, a plurality of photonic crystals are aligned in a row parallel to a longitudinal axis, such that the resonant wavelength respectively associated with a photonic crystal gradually increases, or decreases, along the longitudinal axis. The resonant holder may comprise various rows of photonic crystals parallel to one another. The photonic crystals may form columns, parallel to a lateral axis, such that the photonic crystals of a given column have the same resonant wavelength.

Preferably, the photonic crystals lie in a holder plane, the illuminating light wave propagating to the resonant holder parallel to a propagation axis that is perpendicular or substantially perpendicular to the holder plane.

The method may comprise, prior to step a), a step of forming the reference image, comprising:
 illuminating the resonant holder with the light source, in the spectral band of illumination;
 acquiring an image of the resonant holder with the image sensor, the image thus acquired forming the reference image, the amount of analyte in contact with the resonant holder being considered to be zero.

According to one embodiment, the reference image is an image obtained by:
 illuminating, in the spectral band of illumination, a reference holder that is considered to be representative of the resonant holder illuminated in step a), the amount of analyte in contact with the reference holder being considered to be zero;
 forming an image of the reference holder, the image thus formed corresponding to the reference image.

The resonant holder may comprise reference photonic crystals, which are considered not to make contact with the analyte; the reference image may then be an image of the reference photonic crystals when they are illuminated in the spectral band of illumination.

The reference image and the measurement image form two distinct parts of the same image acquired by the image sensor.

Preferably, for each photonic crystal addressing the analyte, the resonant wavelength depends on a refractive index of the sample, at an interface between the sample and the photonic crystal, the refractive index varying as a function of the amount of analyte making contact with the photonic crystal.

Step e) may comprise the following sub-steps:
 i) on the basis of the measurement image, determining a profile, referred to as the measurement profile, of the intensity of the regions of interest associated with the analyte;
 ii) on the basis of the reference image, determining a profile, referred to as the reference profile, representative of the intensity, in the absence of analyte or in the presence of a known amount of analyte in the sample, of the regions of interest associated with the analyte;
such that whether the analyte is present is determined depending on a variation in the measurement profile with respect to the reference profile.

Step e) may comprise the following sub-steps:
 i) in the measurement image, determining a position, referred to as the measurement position, of a region of interest exhibiting a maximum intensity value among the regions of interest associated with the analyte;
 ii) in the reference image, determining a position, referred to as the reference position, of a region of interest exhibiting a maximum intensity value among the regions of interest associated with the analyte;
such that whether the analyte is present is determined depending on a variation in the measurement position with respect to the reference position.

Step e) may comprise estimating an amount of analyte in the sample, depending on the comparison between the measurement image and the reference image. The amount of analyte may be estimated depending on:
 a variation in the measurement profile with respect to the reference profile;
 or a variation in the measurement position with respect to the reference position.

According to one embodiment:
 each photonic crystal comprises holes produced through a thin layer, the holes being filled by the sample;
 the resonant wavelength of each photonic crystal depends on the radius or on the diagonal of the holes, and on the spacing between the holes, and on the refractive index of the sample.

Each photonic crystal may comprise:
 first holes that have a first dimension, the first dimension being a radius or a diagonal, the first holes defining a first periodic pattern;
 second holes that have a second dimension, the second dimension being strictly smaller than the first dimension, the second holes defining a second periodic pattern;
 the second pattern and the first pattern are offset with respect to each other, parallel to the surface of the resonant holder, by a spatial offset;
such that the resonant wavelength associated with each photonic crystal depends on the first dimension, on the second dimension, and on the spatial offset.

According to one embodiment,
 the photonic crystals addressing a given analyte are aligned parallel to a longitudinal axis;
 the resonant wavelengths respectively associated with two adjacent photonic crystals are offset by a discretization pitch comprised between 1 nm and 10 nm or between 1 nm and 50 nm.

According to one embodiment, the photonic crystals addressing a given analyte are covered with a functionalization layer conducive to selective capture of the analyte on the photonic crystals, for example by grafting.

According to one embodiment, the resonant holder comprises:
 photonic crystals of rank 1 that are configured to capture a first analyte;
 photonic crystals of rank j that are configured to capture a $j^{th}$ analyte that is different from the analytes of rank lower than j.

According to one embodiment,
 the photonic crystals of the same rank are aligned parallel to a longitudinal axis;
 the photonic crystals having the same resonant wavelength in the absence of captured analyte are aligned parallel to a lateral axis, the lateral axis and the longitudinal axis not being parallel.

According to one embodiment, the resonant holder is placed between the light source and the image sensor, such that, in step b), each region of interest formed in the measurement image is representative of an intensity transmitted by the photonic crystal to which said region of interest is optically coupled.

According to one embodiment:
no image-forming optics are placed between the image sensor and the resonant holder;
or an optical system, such as a lens or objective, is placed between the image sensor and the resonant holder, the optical system conjugating the image sensor with the resonant holder.

According to one embodiment, the resonant holder bounds a half-space, comprising the light source; the image sensor is placed in the same half-space as the light source, such that each region of interest formed in the measurement image is representative of an intensity reflected by the photonic crystal to which said region of interest is optically coupled.

A second subject of the invention is a device for analyzing a sample, comprising a light source, an image sensor and a resonant holder, which is placed between the light source and the image sensor, such that the image sensor is configured to acquire an image of the resonant holder, the resonant holder being intended to be placed in contact with a sample, the resonant holder comprising an area containing photonic crystals, which are separate from one another, the resonant holder being such that:
one resonant wavelength is associated with each photonic crystal, such that the transmission or reflection of the light, by each photonic crystal, is maximum at the resonant wavelength with which it is associated, the resonant wavelengths of the photonic crystals defining a spectral band of resonance, lying between 200 nm and 1500 nm;
the light source is configured to simultaneously illuminate various photonic crystals, in a spectral band of illumination that at least partially covers the spectral band of resonance;
at least two photonic crystals are configured to make contact with the same analyte present in the sample, said photonic crystals being associated with two different resonant wavelengths, the resonant wavelength associated with each photonic crystal depending on an amount of analyte in contact with the photonic crystal.

According to one embodiment:
each photonic crystal comprises holes produced through a thin layer, the holes being intended to be filled by the sample;
the resonant wavelength of each photonic crystal depends on the radius of and on the spacing between the holes, and on the refractive index of the thin layer and on the refractive index of the sample.

According to one embodiment, each photonic crystal comprises:
first holes that have a first dimension, the first dimension being a radius or a diagonal, the first holes defining a first pattern;
second holes that have a second dimension, the second dimension being strictly smaller than the first dimension, the second holes defining a second periodic pattern;
the second pattern and the first pattern are offset with respect to each other, parallel to the surface of the resonant holder, by a spatial offset;
such that the resonant wavelength associated with each photonic crystal depends on the first dimension, on the second dimension, and on the spatial offset.

According to one embodiment, the photonic crystals that are configured to make contact with the same analyte are aligned parallel to the same longitudinal axis, the resonant wavelengths respectively associated with two adjacent photonic crystals being offset by a discretization pitch comprised between 1 nm and 10 nm or between 1 nm and 50 nm.

According to one embodiment, the photonic crystals, addressing an analyte, are configured to selectively capture the same analyte. They may notably be covered with a functionalization layer of interest, conducive to a selective capture of the analyte.

According to one embodiment, the resonant holder comprises
photonic crystals of rank 1, which are configured to selectively capture a first analyte;
photonic crystals of rank j, which are configured to selectively capture a jth analyte that is different from the analytes of rank lower than j.

According to one embodiment,
the photonic crystals of the same rank are aligned parallel to a longitudinal axis;
and the photonic crystals associated with the same resonant wavelength, in the absence of analyte, are aligned parallel to a lateral axis, the lateral axis and the longitudinal axis not being aligned.

According to one embodiment, the photonic crystals lie in a holder plane, and the light source is configured to emit, in the spectral band of illumination, an illuminating light wave that propagates to the resonant holder along a propagation axis that is perpendicular or substantially perpendicular to the holder plane.

The holder plane may lie parallel to a detection plane defined by the image sensor.

The device may have one of the features described with reference to the first subject of the invention.

The invention will be better understood on reading the description of the examples of embodiment presented, in the remainder of the description, with reference to the figures listed below.

FIGURES

FIGS. 2A to 2H schematically show the operation of the invention according to a first embodiment.

FIG. 2A shows an example of arrangement of the image sensor with respect to the resonant holder.

FIG. 2B schematically shows photonic crystals addressing the same analyte and distributed in the same row.

FIG. 2C shows an example of a spectral intensity function that the light source follows, in a spectral band of resonance defined by the resonant wavelengths of the photonic crystals formed on the resonant holder.

FIGS. 2D, 2E and 2F illustrate an intensity transmitted by each photonic crystal, respectively:
in the absence of analyte;
in the presence of a small amount of analyte captured by the resonant holder;
in the presence of a large amount of analyte captured by the resonant holder.

FIG. 2G shows profiles, along the longitudinal axis, of the intensity transmitted by the photonic crystals shown in FIG. 2D (dashed line), FIG. 2E (solid line) and FIG. 2F (dash-dotted line).

FIG. 2H schematically shows the main steps of a method according to the invention.

Figure 3A:
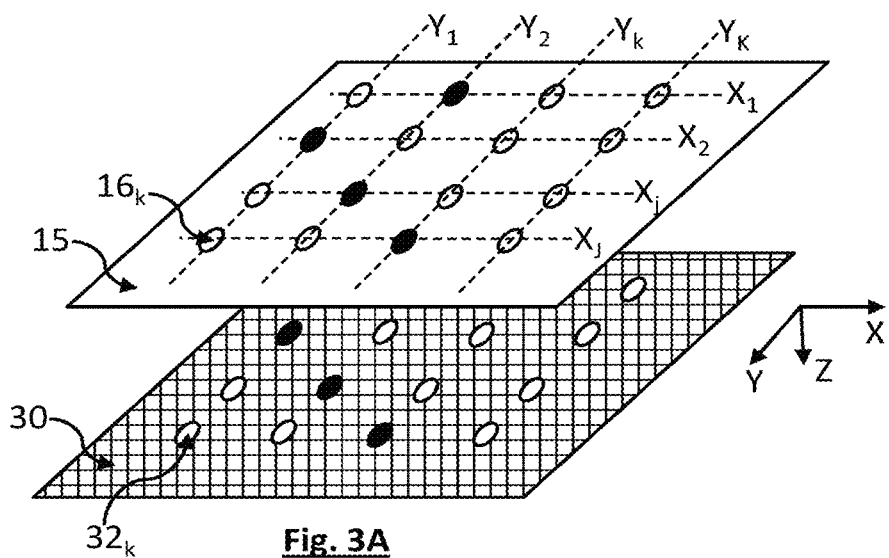

FIG. 3A shows a superposition of a resonant holder and of an image sensor of a device according to the invention, the invention operating in an embodiment that is referred to as two-dimensional.

Figure 3B:
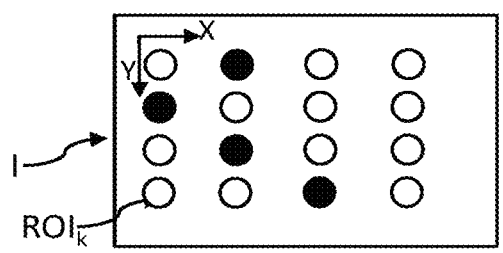
Figure 3C:
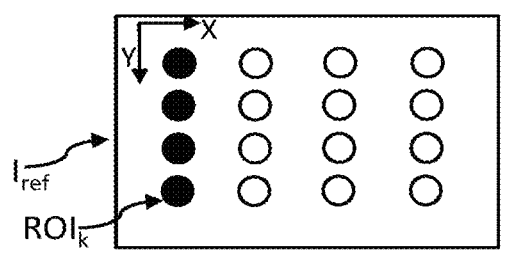

FIGS. 3B and 3C illustrate an intensity transmitted by each photonic crystal in the presence of analytes captured by the resonant holder and in the absence of analyte captured by the holder, respectively.

Figure 4A:
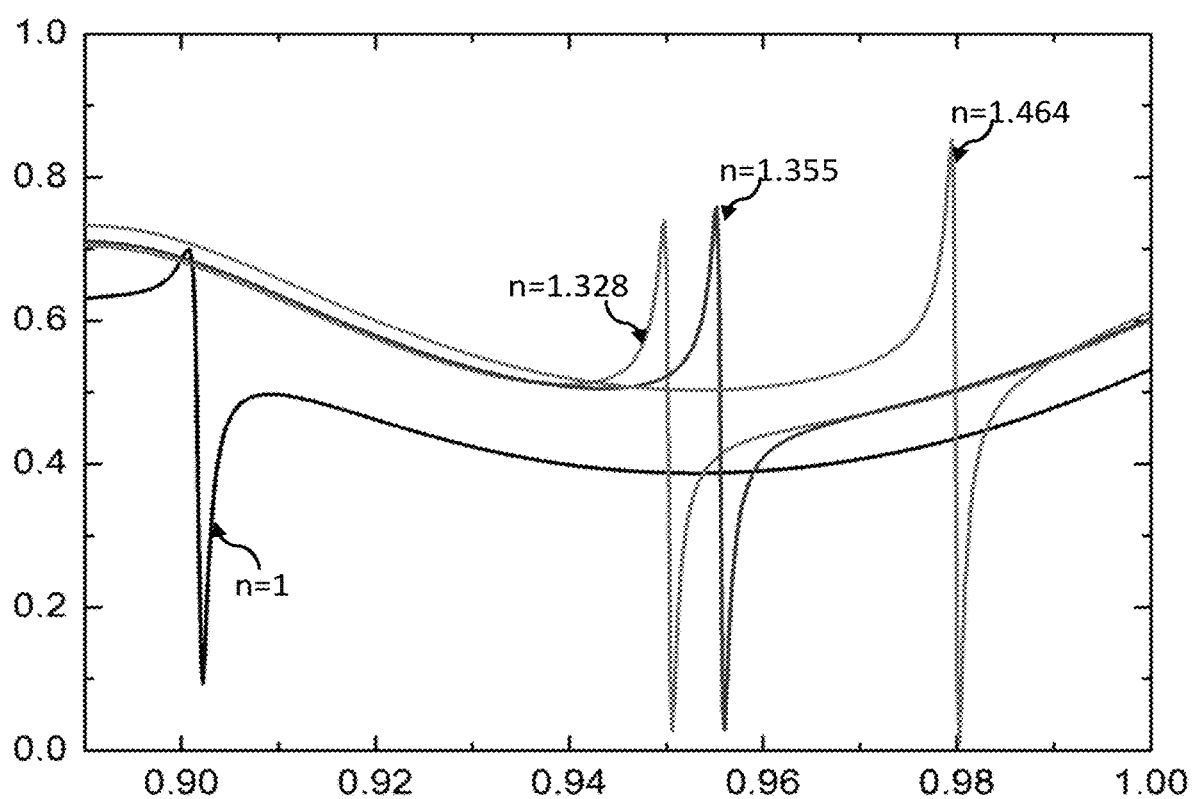

FIG. 4A shows a variation of the resonant wavelength in reflection of a photonic crystal as a function of wavelength.

Figure 4B:
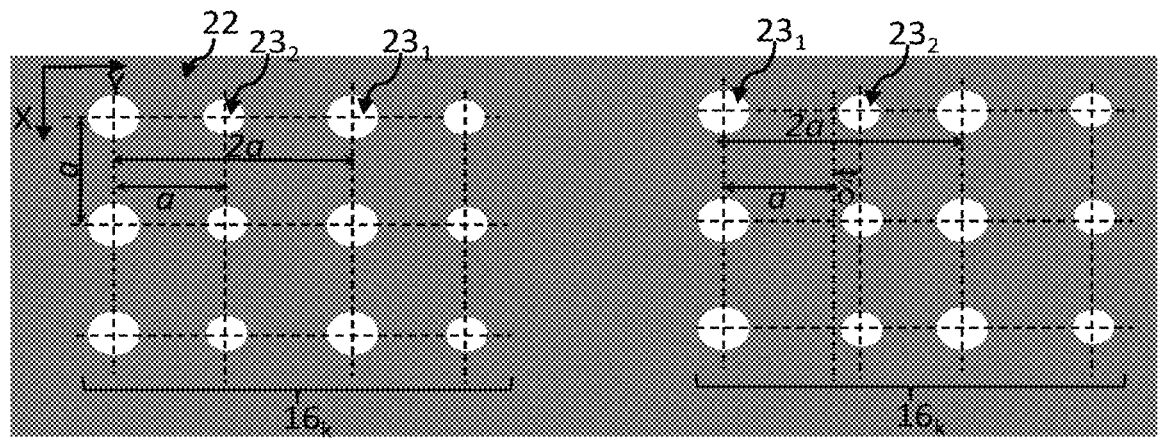

FIG. 4B shows a detail of a resonant holder, the resonant holder comprising holes distributed with a double period.

Figure 4C:
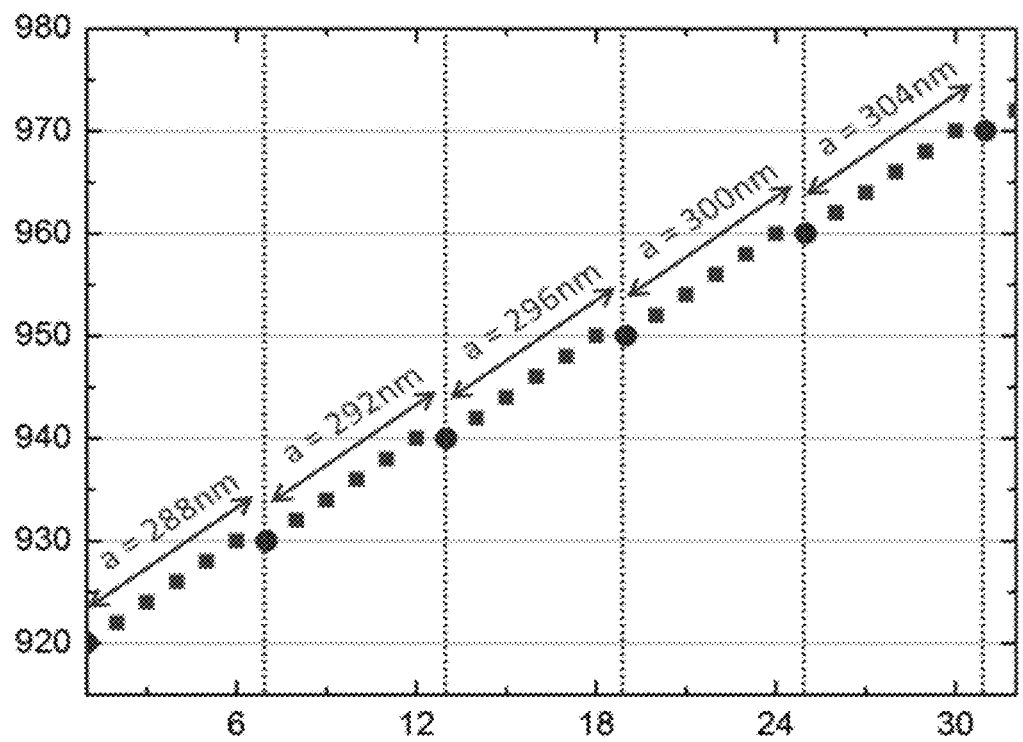

FIG. 4C shows a variation in the resonant wavelength as a function of the arrangement of the holes of a photonic crystal such as shown in FIG. 4B.

Figure 5A:
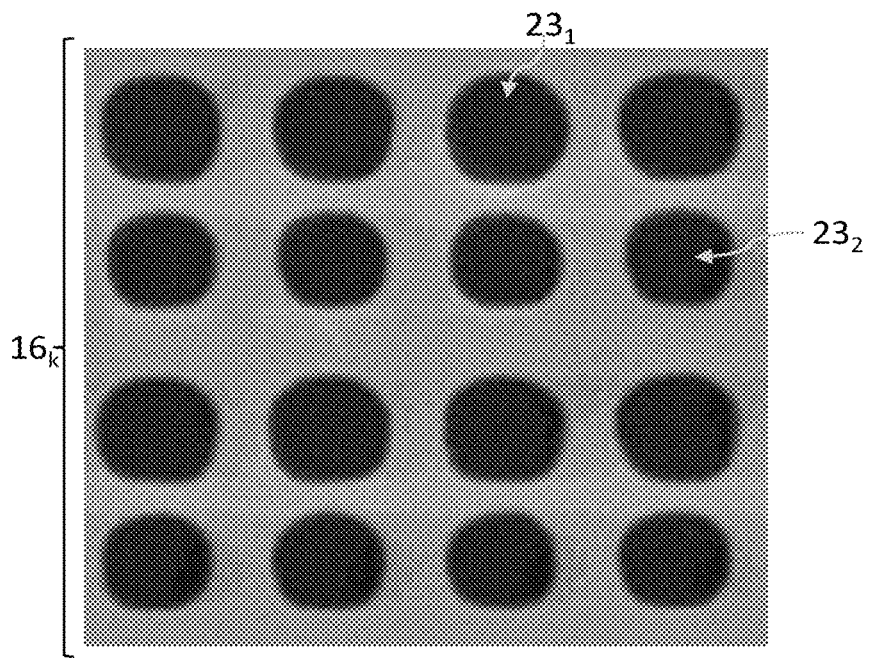
Figure 5B:
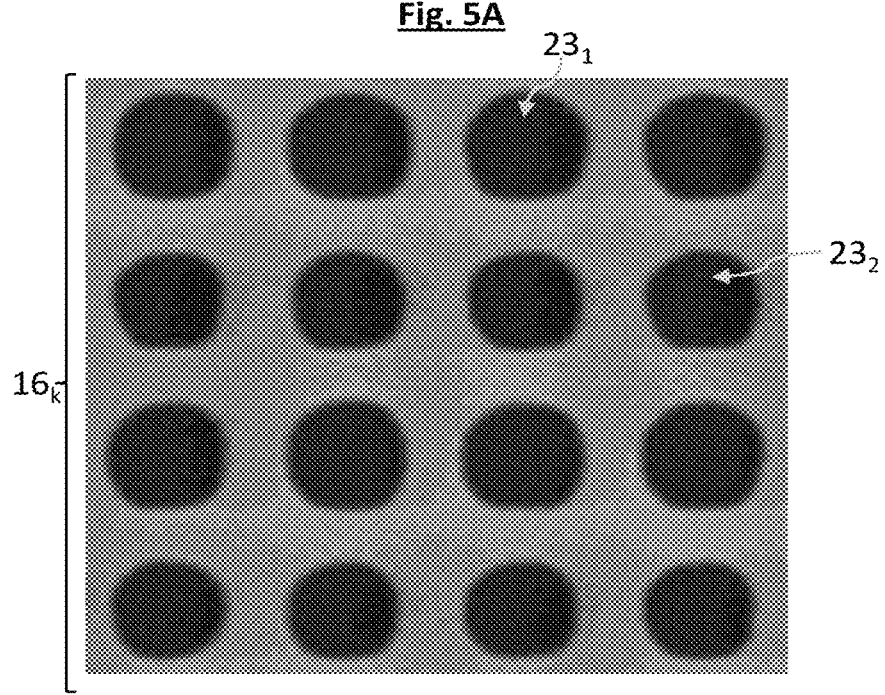

FIGS. 5A and 5B are examples of two different arrangements of holes forming photonic crystals.

FIGS. 6A to 6M illustrate steps for fabricating a resonant holder.

Figure 7A:
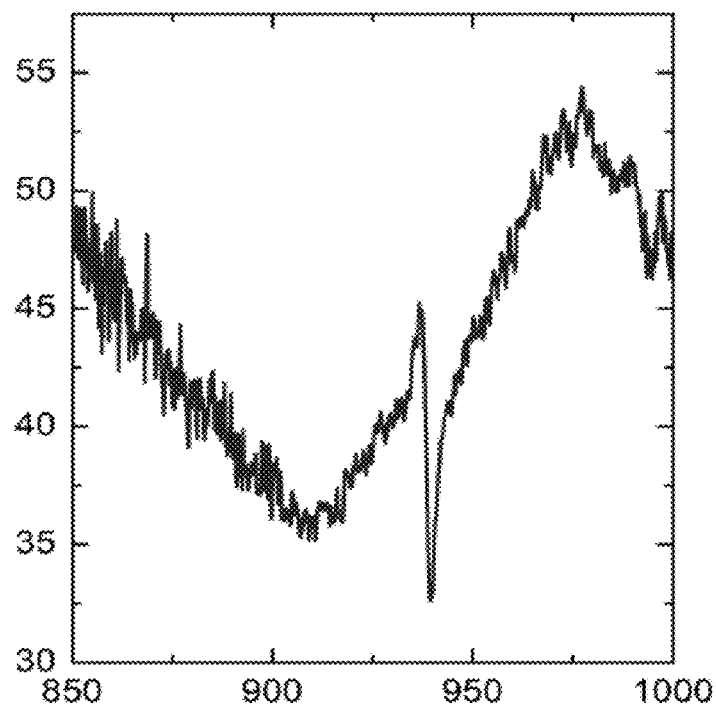

FIG. 7A shows a variation in the spectral transmission of a photonic crystal illuminated by a polychromatic light beam, at normal incidence, as a function of the illuminating wavelength. FIG. 7A was obtained experimentally.

Figure 7B:
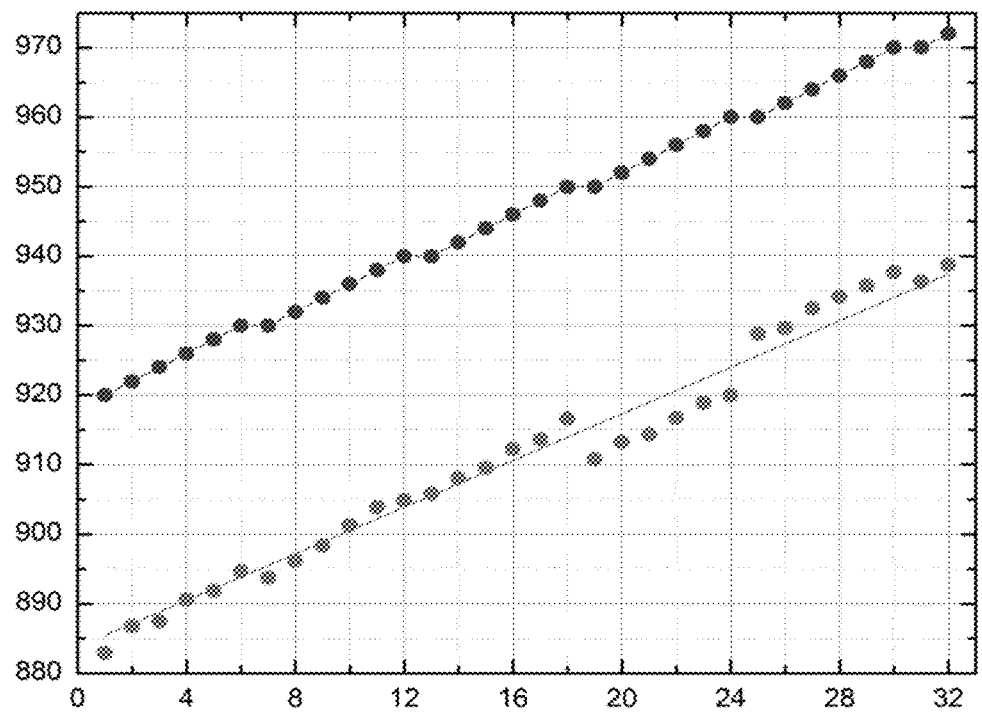

FIG. 7B is a comparison of resonant wavelengths in reflection, measured experimentally and modeled, for various photonic crystals.

Figure 1A:
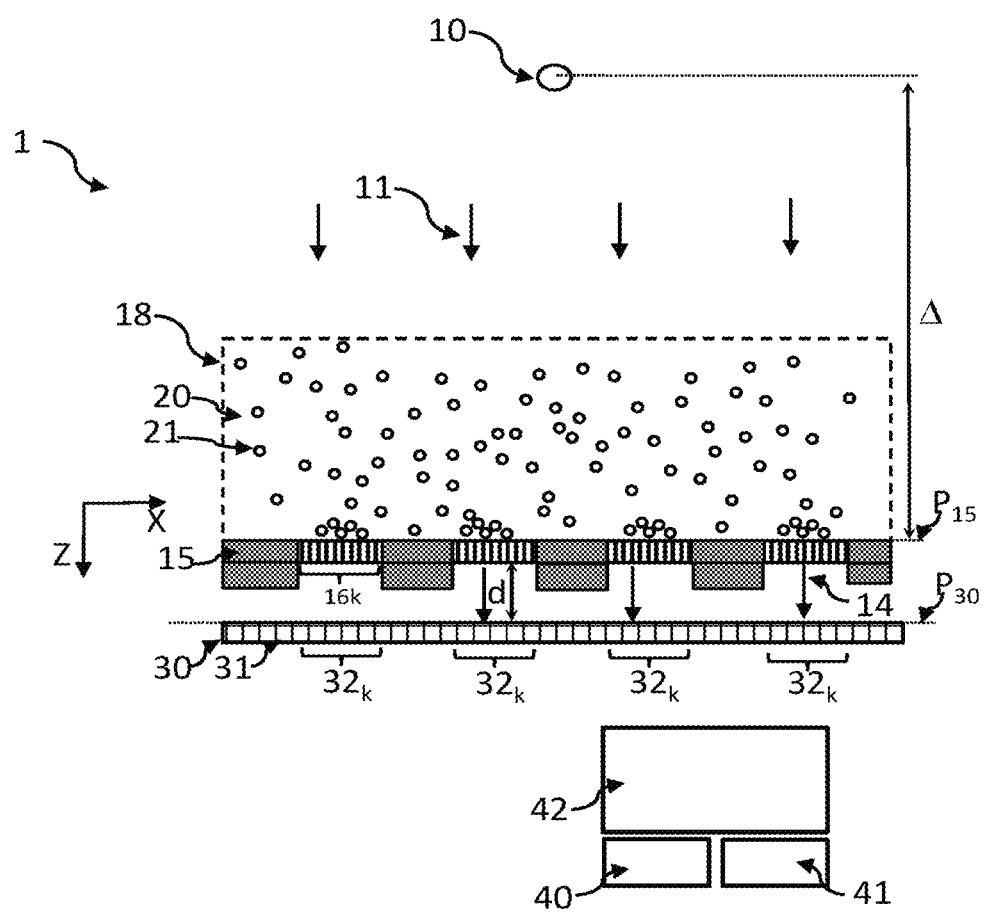
FIG. 1A is a first example of a device according to the invention.
Figure 7C:
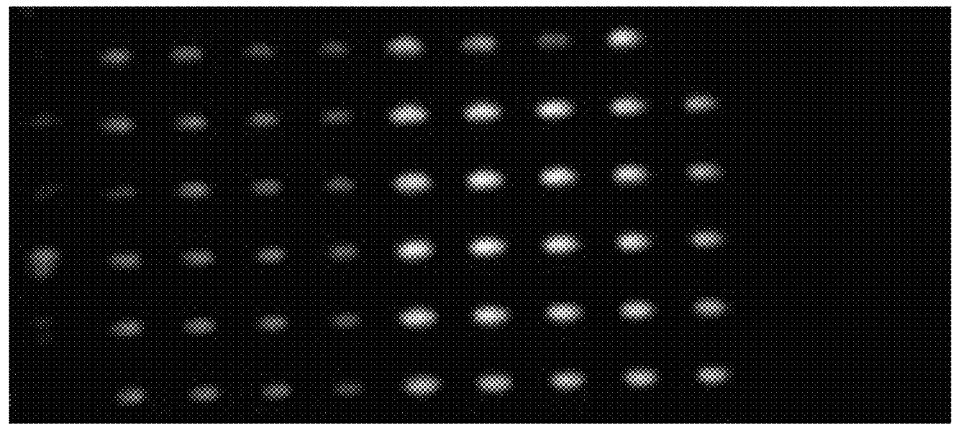

FIG. 7C shows an experimental image obtained using apparatus such as shown in FIG. 1A, the sample being water.

Figure 7D:
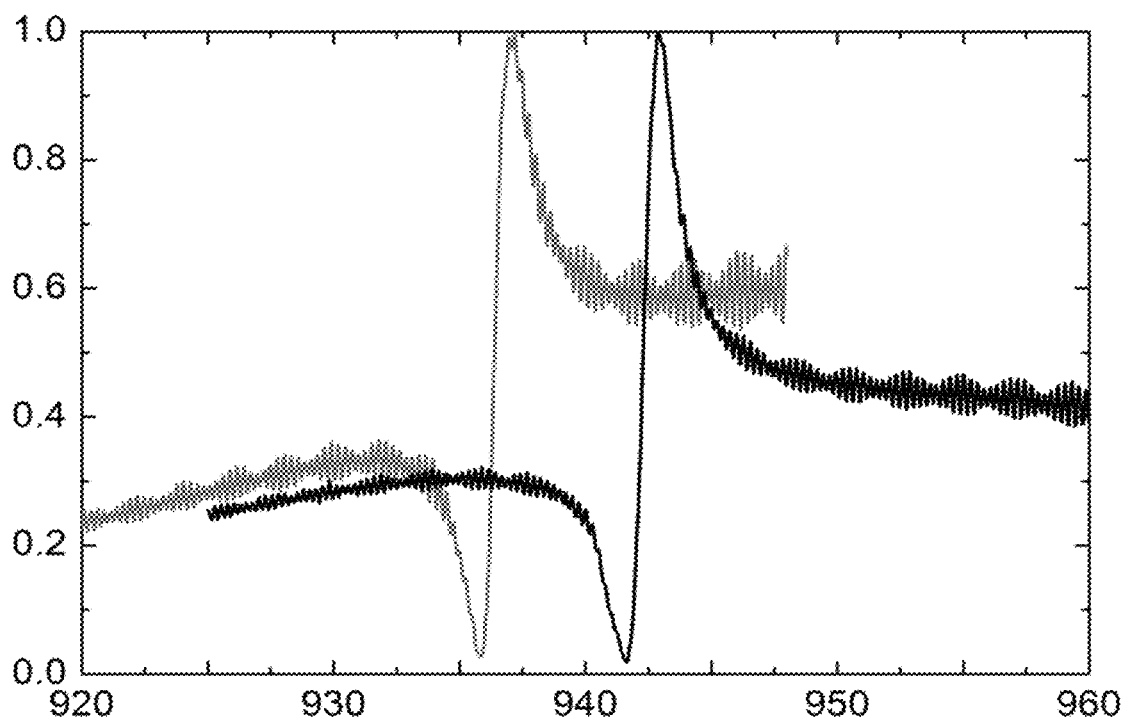

FIG. 7D illustrates a variation in the resonant wavelength in reflection when the sample is formed by two different liquids.

Figure 8A:
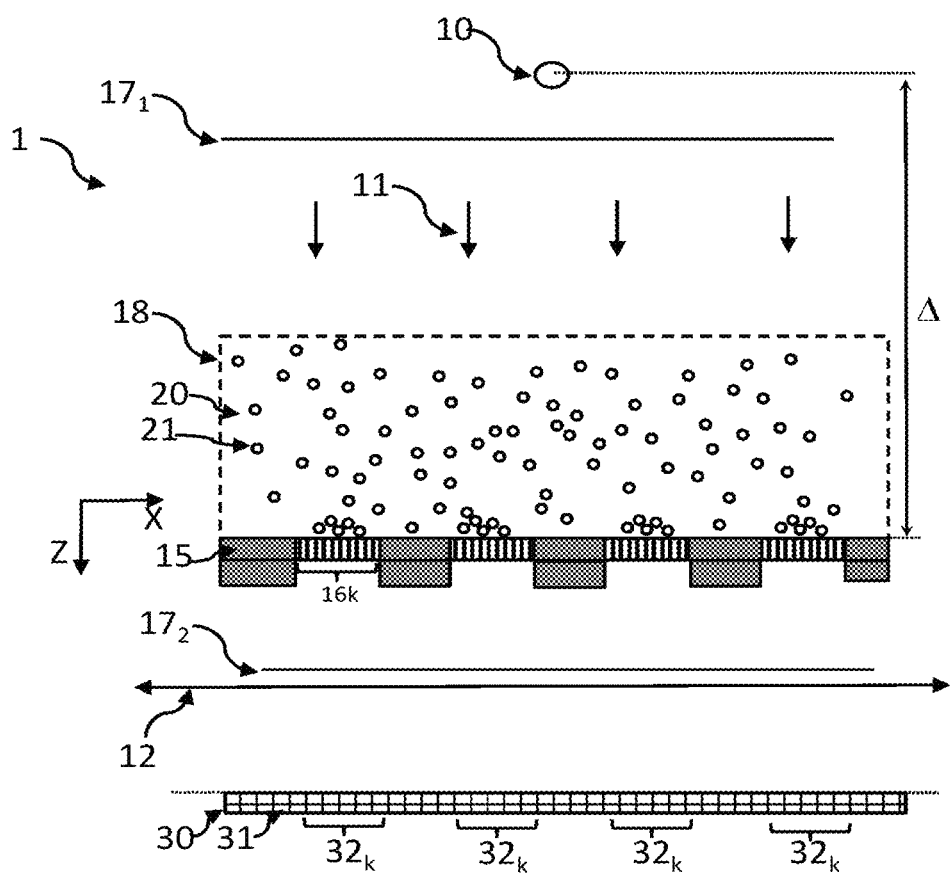

FIG. 8A shows one preferred embodiment of the invention.

Figure 8B:
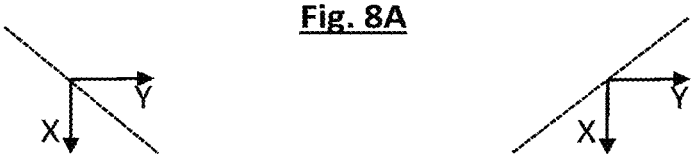

FIG. 8B schematically shows the directions of polarization of polarizers described with reference to FIG. 8A.

Figure 8C:
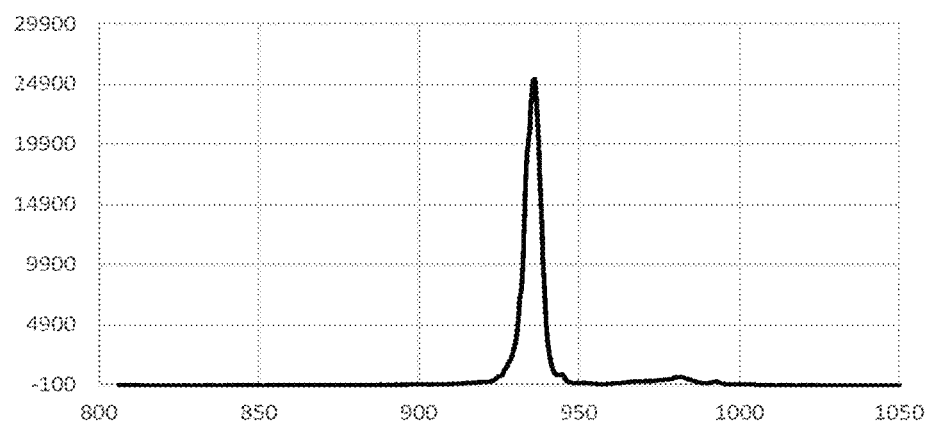

FIG. 8C shows a transmission spectrum of a photonic crystal, the photonic crystal being positioned between two polarizers in the configuration of FIG. 8B, the spectrum having been measured by a spectrometer.

Figure 8D:
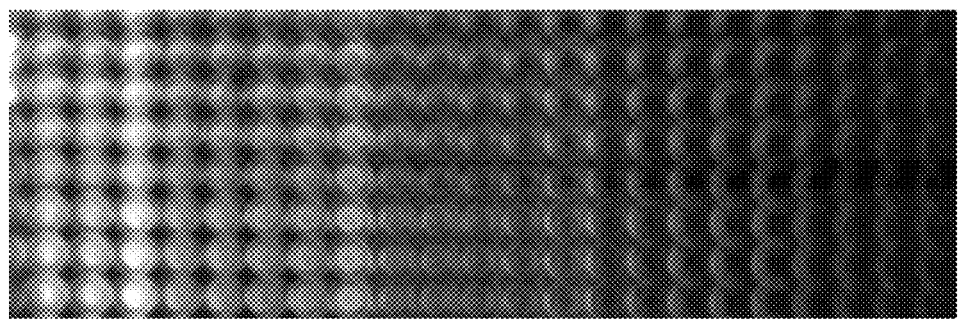

FIG. 8D is an image of a resonant holder exposed to a light wave emitted by a light source and placed in the configuration corresponding to FIGS. 8A and 8B.

Figure 8E:
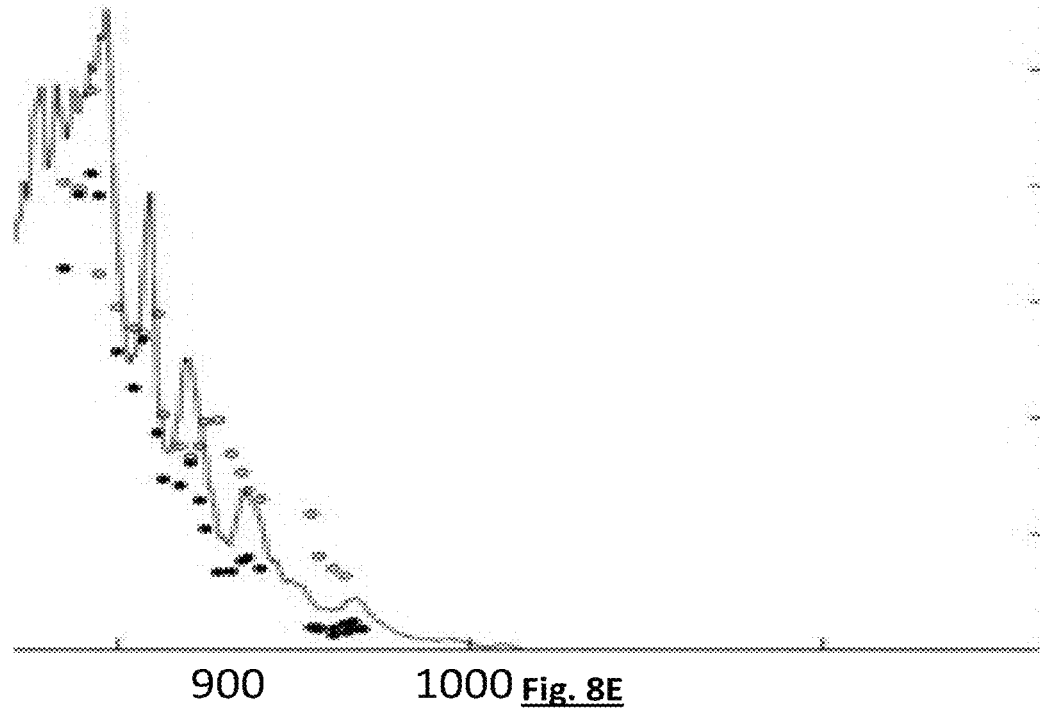

FIG. 8E shows a spectral intensity profile of the light source. It also shows intensities measured using a spectrometer, focused on each photonic crystal of the holder. It also shows intensity levels measured along one row of FIG. 8D.

Figure 9A:
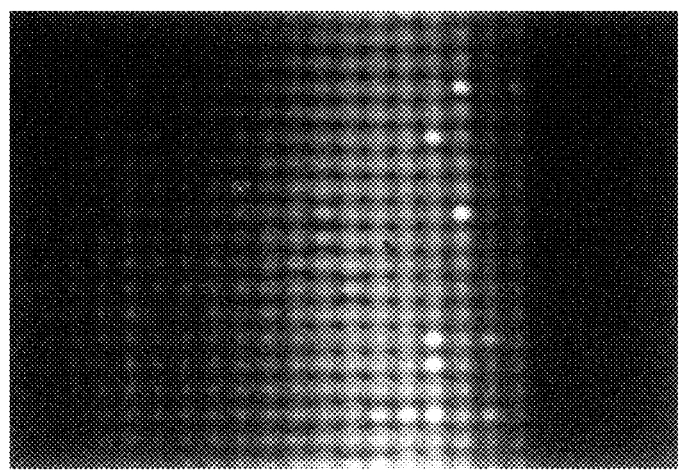
Figure 9B:
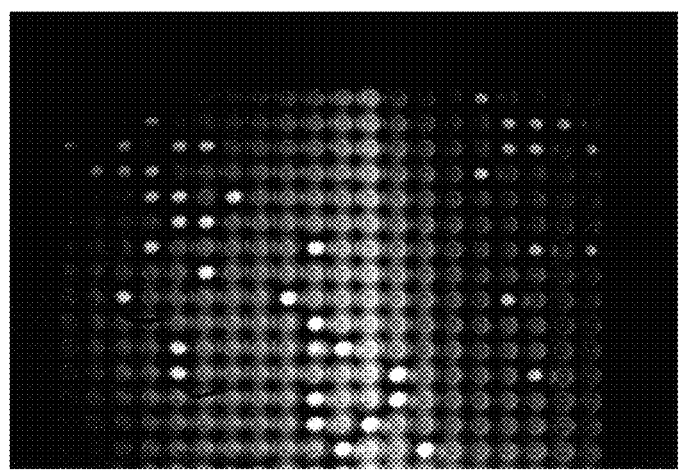

FIGS. 9A and 9B are images of a resonant holder illuminated according to a spectral illumination function, and brought into contact with water and ethanol, respectively.

Figure 9C:
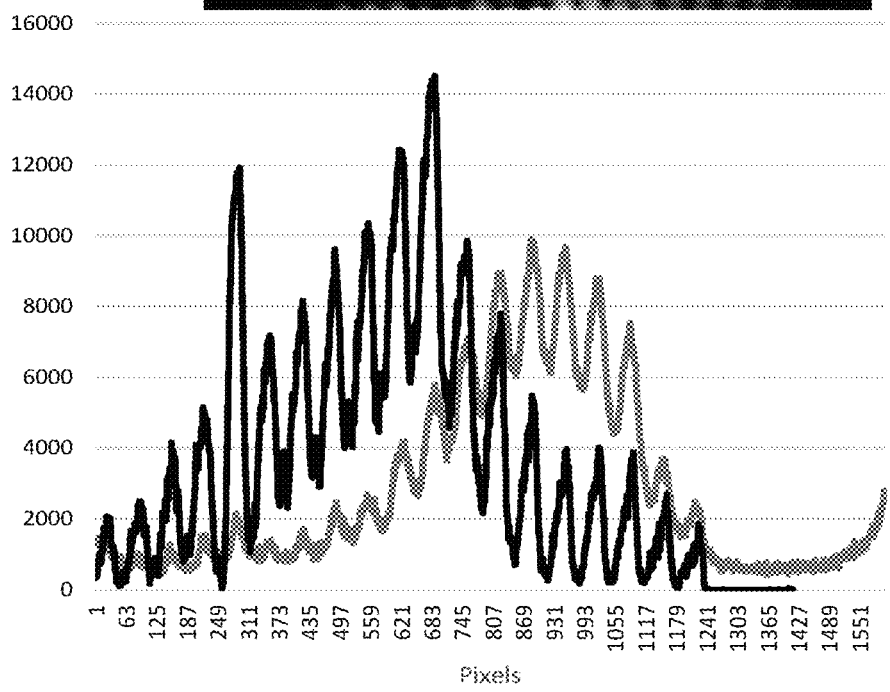

FIG. 9C is a comparison of horizontal profiles formed in FIGS. 9A and 9B, respectively.

DESCRIPTION OF PARTICULAR EMBODIMENTS

FIG. 1A shows an example of a device 1 for analyzing a sample according to the invention. The device 1 comprises a light source 10, which is configured to emit an illuminating light wave 11 that propagates to a sample 20. The illuminating light wave propagates parallel to a propagation axis Z. The sample 20 is placed on a holder 15, which is referred to as the resonant holder. The sample 20 may comprise a fluid medium, for example a gaseous or liquid medium, comprising at least one analyte 21. The sample is placed in contact with the resonant holder 15, at least temporarily.

By analyte, what is meant is a chemical or biological species the presence, and possibly an amount, of which in the sample it is desired to determine. The analyte 21 may, for example, be a chemical molecule, a protein, a peptide, an antibody, an antigen, a fragment of a nucleotide sequence, or a particle. By particle, what is meant for example is a biological cell, a droplet that is insoluble in a medium, or a nanobead. It may also be a question of a microorganism, a bacterium for example, a yeast or a microalgae. Preferably, a particle has a diameter, or is inscribed in a diameter, smaller than 20 μm, or even than 10 μm or than 5 μm.

By resonant holder, what is meant is a holder one portion of which is able to resonate, so as to transmit or to reflect a maximum light intensity at a resonant wavelength. The structure of the resonant holder is described below.

The sample 20 may take the form of a drop deposited on the resonant holder 15. It may also be a question of a fluid confined in a fluidic chamber 18 associated with the resonant holder 15. The resonant holder may for example consist of a wall of the fluidic chamber 18 in which the sample lies.

The device 1 also comprises an image sensor 30. The image sensor is preferably a pixelated sensor, comprising pixels 31 arranged in a matrix array. The pixels of the image sensor 30 define a detection plane $P_{30}$.

Preferably, the detection plane $P_{30}$ is placed perpendicular to the propagation axis Z, or substantially perpendicular to the latter. By substantially perpendicular, what is meant is perpendicular to within an angular tolerance of ±20°, or preferably ±10°, or even ±5°. Thus, the illuminating wave 11 emitted by the light source 10 reaches the holder at a normal incidence, to within the angular tolerance.

Preferably, the resonant holder 15 defines a capture plane $P_{15}$. The capture plane $P_{15}$ lies perpendicular to the propagation axis Z, or substantially perpendicular to the latter. The resonant holder extends along a longitudinal axis X and a lateral axis Y. The axes X and Y are coplanar with the capture plane. They are secant, and preferably perpendicular.

The light source 10 may be monochromatic or polychromatic. The illuminating wave 11 lies in a spectral band of illumination Δλ, the width of which is preferably smaller than 200 nm, or even smaller than 100 nm or than 10 nm. The spectral band of illumination preferably lies in the visible domain, or in the near UV or in the infrared. Thus, the spectral band of illumination lies below 1500 nm. Preferably, the light source 10 is placed at a distance Δ from the resonant holder 15, such that the light wave 11 reaches the latter in the form of a plane wave. A collimating optical element, known to those skilled in the art, may be placed between the light source 10 and the sample 20, so as to form a plane light wave 11.

Preferably, the detection plane $P_{30}$ extends parallel to the capture plane $P_{15}$.

An important aspect of the invention is that the resonant holder 15 comprises nanostructured elementary zones that are separate from one another, each elementary zone forming one photonic crystal 16. Thus, the resonant holder comprises photonic crystals $16_k$, which are different from one another, and which are spaced from one another. The index k is an integer strictly comprised between 1 and K, K corresponding to the number of photonic crystals formed on the resonant holder 15.

Each photonic crystal $16_k$ has a resonant wavelength $\lambda_k$ that is specific thereto. At the resonant wavelength $\lambda_k$ that is associated with it, each photonic crystal $16_k$ exhibits a peak in light transmission or reflection. Each crystal thus has a resonant wavelength in reflection and a resonant wavelength in transmission.

The image sensor 30 is configured such that the pixels 31 are divided into groups of pixels $32_k$, the pixels 31 belonging to the same group of pixels $32_k$ being optically coupled to the same photonic crystal $16_k$. The image sensor 30 is for example a CMOS matrix-array sensor.

By group of pixels, what is meant is a pixel or a set of pixels that are adjacent to one another and optically coupled to the same photonic crystal.

By optically coupled, what is meant is that the pixels 31 of the same group of pixels $32_k$ collect light the intensity of which is at least 80% or 90% due to light propagating through the photonic crystal $16_k$.

In the example shown in FIG. 1A, the distance d between each photonic crystal $16_k$ and pixel group $32_k$ that is respectively associated with it, is 500 µm. This distance is preferably comprised between a few tens of µm and 1 mm. A small distance improves the optical coupling between each photonic crystal $16_k$ and pixel group $32_k$ associated with it. The configuration shown in FIG. 1A is a lensless imaging configuration, with no imaging optics interposed between the resonant holder 15 and the image sensor 30. This is an inexpensive and compact configuration.

Figure 1B:
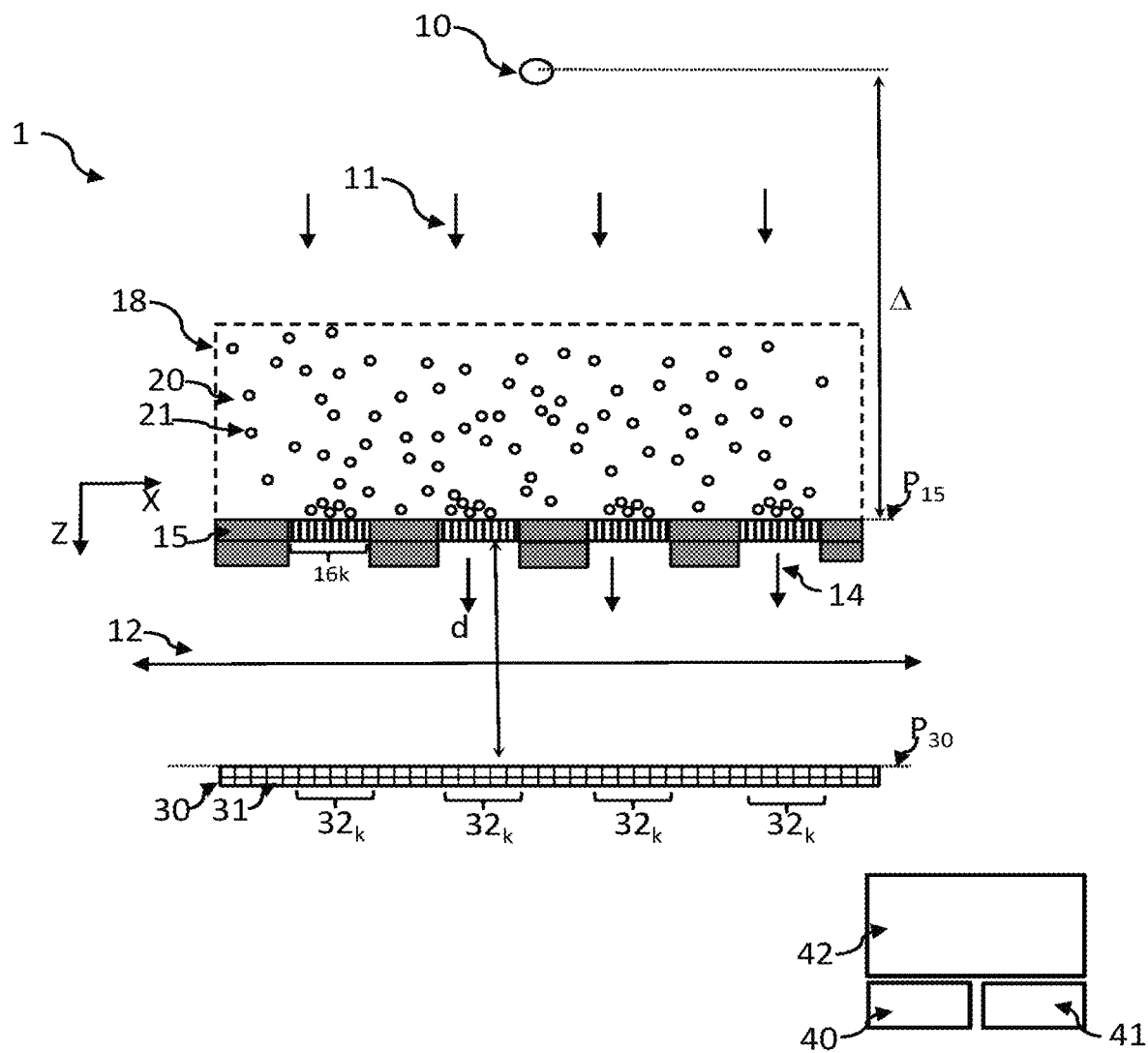
FIG. 1B shows a second example of a device according to the invention.

Alternatively, as shown in FIG. 1B, an optical system 12, for example a lens or objective, is placed between the resonant holder 15 and the image sensor 30. The optical system 12 allows each photonic crystal $16_k$ to be optically coupled to one group of pixels $32_k$. Such an optical system 12 allows each diffraction grating $16_k$ to be conjugated with one group of pixels $32_k$.

The light source is placed at a distance Δ from the resonant holder, such that a plurality of photonic crystals are simultaneously illuminated by the light source. Thus, at least 3, and preferably at least 5 or 10 photonic crystals are simultaneously illuminated by the light source. The illumination of the resonant holder is preferably extensive, in the sense that the illuminated area is preferably larger than 1 mm², or even 1 cm². The illuminated area may correspond to the field of observation of the image sensor 30. In the lens-less configuration described with reference to FIG. 1A, the illuminated area corresponds to the area of the image sensor, i.e. an area of the order of 35 mm².

The device 1 also comprises a processing unit 40, for example a microprocessor, configured to process and/or display images acquired by the image sensor 30. The processing unit may be connected to a memory 41, comprising instructions for implementing image-processing algorithms. The processing unit 40 is preferably connected to a screen 42.

The configurations schematically shown in FIGS. 1A and 1B are transmission configurations, in which the resonant holder 15 is interposed between the light source 10 and the image sensor 30. Thus, the image sensor 30 detects a light wave 14 transmitted by the resonant holder 15. By transmitted, what is meant is propagating in the same direction as the incident light wave 11. In another configuration, illustrated in FIG. 1C, the capture plane $P_{15}$ separates space into two half-spaces. The image sensor 30 is located in the same half-space as light source 10. In the example shown in FIG. 1C, a half-slivered mirror 13 reflects toward the sample 20 the light wave 11 emitted by the light source 10, and transmits to the image sensor 30 a light wave 14' reflected by the resonant holder 15. Such a configuration is usually designated by the expression "reflection configuration". An optical system 12 allows each photonic crystal $16_k$ to be optically coupled to one group of pixels $32_k$ of the image sensor 30, as described above.

Figure 1C:
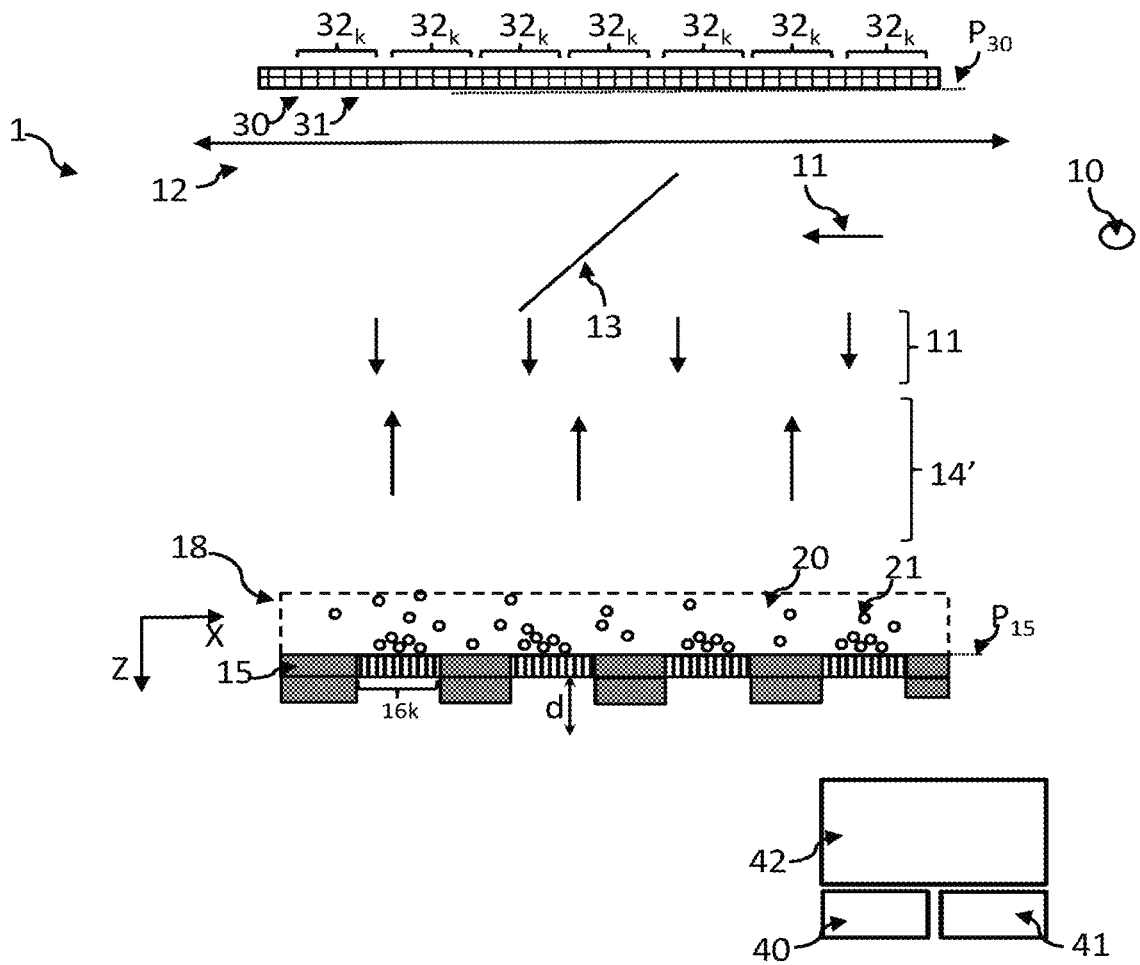
FIG. 1C is a third example of a device according to the invention.
Figure 1D:
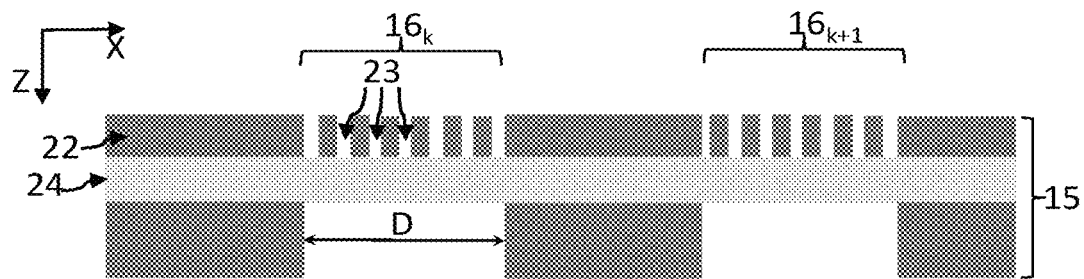
FIG. 1D is a detail of the resonant holder shown in FIGS. 1A, 1B and 1C.

FIG. 1D shows a cross section, in a plane perpendicular to the capture plane $P_{15}$, of a detail of the resonant holder 15. Each photonic crystal $16_k$, $16_{k+1}$ is formed by holes 23 that are formed in a thin layer 22, and that open onto the surface of the latter. The thin layer 22 may be made from a dielectric or semiconductor. The holes 23 are arranged in a periodic pattern, which is preferably two-dimensional. During use of the resonant holder, the holes 23 are intended to be filled by the sample 20. It is preferable for the thin layer 22 to have a refractive index very different from the refractive index of the sample, so as to obtain a high index contrast between the sample 20, filling the holes 23, and the thin layer 22. Preferably, the refractive-index difference between the sample and the material forming the thin layer 22 is larger than 0.1, or even than 0.5. Thus, the refractive index of the thin layer 22 is preferably higher than 2, and more preferably higher than 3. For example, the thin layer may be made of silicon (n=3.48), or of silicon nitride $Si_3N_4$ (n=2) or of titanium oxide ($TiO_2$).

Thus, the thin layer 22 comprises a plurality of resonant photonic crystals $16_k$ that are separate from one another, and that each have a resonant wavelength $\lambda_k$ in transmission or in reflection. The thickness of the thin layer 22 is preferably comprised between 20 and 500 nm, or between 20 nm and 1 µm. The holes 23 extend through the thin layer 22, about an axis perpendicular to the plane of the holder. The holes 23 may in particular extend about an axis parallel to the propagation axis Z.

In the holder plane $P_{15}$, the photonic crystals $16_k$ have a diagonal or a diameter comprised between 10 µm and 500 µm, of 100 µm for example. Each photonic crystal is borne by a transparent or translucent membrane, formed by a layer 24. Fabrication of the photonic crystals is described below, with reference to FIGS. 6A to 6M.

The spectral properties of the photonic crystals with respect to transmission and reflection of light may be determined using simulations performed via computer codes. Specifically, the properties of propagation of light in the photonic crystals stem from their specific periodic arrangement. These propagation properties may easily be modeled, by a person skilled in the art, on the basis of Maxwell's equations. In the remainder of this description, the modelling was carried out using the software package Rsoft and a method of RCWA type.

By photonic crystal, what is meant is a structure the refractive index of which varies periodically, on the wavelength scale, in one or more directions. In the examples described in this description, the photonic crystals are two-dimensional, this being a preferred configuration. The invention therefore takes advantage of the development of techniques for micro-structuring dielectrics, semiconductors or metals, allowing control of the interaction of electromagnetic waves in three-dimensional structures based on the arrangement of materials of various indices.

Each photonic crystal $16_k$ transmits (or reflects) light according to a spectral transmission (or reflection) function describing a variation in a light intensity transmitted (or reflected) by the photonic crystal, as a function of wavelength. The exploitation of Fano resonance makes it possible to design compact resonant photonic crystals, which may be illuminated collectively by one illuminating light wave, at a normal incidence. This makes it possible to simultaneously illuminate, in a simple manner, photonic crystals distributed in one or two dimensions. The spectral transmission function of each photonic crystal exhibits a maximum, at a resonant wavelength in transmission. Analogously, the spectral reflection function exhibits a maximum, at a resonant length in reflection.

The spectral transmission or reflection function, and in particular the resonant wavelengths in transmission or in reflection, depend first of all on the structure of each photonic crystal, i.e. on the size and on the spatial arrangement of the holes 23 produced in the thin layer 22, to form the photonic crystal $16_k$. In reflection or in transmission, the resonant wavelength $\lambda_k$ also depends on the refractive-index contrast between the thin layer 22 and the sample, in the holes 23. The resonant wavelength also depends on the thickness of the thin layer 22. It also depends on the refractive index and on the thickness of the transparent layer 24.

FIGS. 2A to 2H illustrate the principle of the invention. In this example, the configuration is a transmission configuration such as illustrated in FIG. 1A. FIG. 2A shows the resonant holder 15, and photonic crystals $16_k$ distributed over the resonant holder. The image sensor 30 lies parallel to the resonant holder. Groups of pixels $32_k$ have also been shown, each group of pixels being optically coupled to one photonic crystal $16_k$. Each group of pixels $32_k$ comprises at least one pixel. In the lensless-imaging configuration (see FIG. 1A), one group of pixels may be optically coupled to one photonic crystal by minimizing the distance d between the image sensor 30 and the resonant holder 15. When an optical system 12 is used, coupling is achieved via the optical system (see FIG. 1B or FIG. 1C), said optical system conjugating each group of pixels $32_k$ with one photonic crystal.

Before it is brought into contact with the sample, the resonant holder 15 will have undergone a surface functionalization, in the holder plane $P_{15}$, such that each photonic crystal is able to capture a predetermined analyte. Surface functionalization is a concept known to those skilled in the art. It consists in adding a specific function to the surface to be functionalized, by nanostructuring, or by depositing a coating, or by adsorbing or grafting molecules with specific properties. In the present case, the surface functionalization confers, on each photonic crystal, a property enabling selective capture of an analyte. The analyte may be captured via formation of a covalent, hydrogen or electrostatic bond with the analyte and/or via grafting of the analyte with a ligand placed on the functionalized capturing surface. Following the functionalization, the holder plane $P_{15}$ is also a functionalized capture plane, i.e. one that has been functionalized to capture one or more analytes.

When the resonant holder is placed in contact with the sample, the sample fills the holes 23 of each photonic crystal $16_k$. The spectral properties of each photonic crystal $16_k$ with respect to transmission (or reflection) of the light are then governed by the structure of each photonic crystal (in particular the size and distribution of the holes 23) and the respective refractive indices of the sample 20 and of the thin layer 22.

In FIG. 2B, the photonic crystals $16_k$ have been shown addressing the same analyte. They are aligned in rows, parallel to the longitudinal axis X.

Because of the surface functionalization, when the desired analyte is present in the sample, the concentration of analyte captured by the holder increases after the latter has been brought into contact with the sample. This results in a local variation in the index of the sample, at the interface between the sample and the functionalized holder. Under the effect of such a variation in index, the spectral transmission (or reflection) properties of each functionalized photonic crystal change—in particular the resonant wavelength of the photonic crystals changes.

A noteworthy aspect of the invention is that the photonic crystals are dimensioned such that:
the respective resonant wavelengths of each photonic crystal are different from one another;
the spectral offset between two resonant wavelengths of two adjacent photonic crystals is small and controlled.

All the resonant wavelengths of photonic crystals addressing the same analyte lie between a minimum resonant wavelength $\lambda_{r,min}$ and a maximum resonant wavelength $\lambda_{r,max}$. The latter bound a spectral band of resonance $\Delta\lambda_r$. It is necessary for the spectral band of illumination $\Delta\lambda$ of the light source to be, at least partially, included in the spectral band of resonance $\alpha\lambda_r$. The spectral band of illumination $\Delta\lambda$ may be the same as the spectral band of resonance $\alpha\lambda_r$. It may be wider or narrower than the spectral band of resonance $\Delta\lambda_r$. FIG. 2C shows the spectral band of illumination, the spectral band of resonance $\Delta\lambda_r$ and the respective resonant wavelengths $\lambda_{k=1}, \ldots, \lambda_k, \ldots, \lambda_{k=K}$ of the photonic crystals $16_{k=1}, \ldots, 16_k, \ldots, 16_{k=K}$.

In the spectral band of resonance $\alpha\lambda_r$, which is defined by the photonic crystals of the holder, the intensity of the light wave 11 emitted by the light source 10 is not constant. In the spectral band of resonance $\alpha\lambda_r$, the intensity of the light wave 11 is variable, and follows a spectral illumination function $f$. The spectral illumination function $f$ defines the intensity of the incident light wave 11 at various wavelengths of the spectral band of resonance, such that:

$$I(\lambda)=f(\lambda)$$

where:
$\lambda$ is a wavelength of the spectral band of resonance $\alpha\lambda_r$;
$I(\lambda)$ is the intensity of the illuminating wave 11, or illumination intensity, at the wavelength $\lambda$.

It is important that the illumination function $f$ not be constant, i.e. that the intensity of the illuminating wave not be uniform in the spectral band of resonance $\alpha\lambda_r$. The illumination function $f$ may thus be monotonic in the spectral band of illumination, and for example an increasing or decreasing function. It may also increase (decrease, respectively) to an extremum and then decrease (increase, respectively) from the extremum. When the light source is monochromatic, the illumination function forms a peak in the spectral band of resonance $\alpha\lambda_r$.

In the preferred embodiment, two adjacent photonic crystals $16_k$, $16_{k+1}$ have resonant wavelengths that are offset by a known spectral offset $d\lambda_k$. The spectral resolution of the method is dependent on the spectral offset $d\lambda_k$. In absolute value, the spectral offset $d\lambda_k$ is preferably smaller than 10 nm, and more preferably smaller than 5 nm, or even than 2 nm. It corresponds to a spectral discretization pitch, with which the illuminating light wave 11 is discretized, as described with reference to FIG. 2G. Photonic-crystal structures allowing such a spectral offset to be obtained are described below.

On capture of the analyte, the resonant wavelength of each photonic crystal changes, passing from a value $\lambda_{ref,k}$, in the absence of analyte, to a value $\lambda_k$ in the presence of analyte, with $\lambda_k=\lambda_{ref,k}+\delta\lambda$ (1). It will be noted that the variation in resonant wavelength $\delta\lambda$ is the same for all the photonic crystals addressing a given analyte. In other words, the sensitivity of the resonant wavelength to variations in index is the same for all the various photonic crystals.

The change in resonant wavelength $\delta\lambda$ is consecutive to the capture of the analyte, which generally results in an increase in the index at the interface between the resonant holder and the sample. The increase in index causes a variation in the resonant wavelength of each photonic crystal.

Thus, the invention is based on a measurement of a variation in resonant wavelength $\delta\lambda$ under the effect of capture of the analyte by photonic crystals addressing the same analyte.

The variation $\delta\lambda$ in resonant wavelength is observed by taking into account a reference configuration, in which the captured amount of analyte is known. Preferably, in the reference configuration, the amount of analyte captured by each photonic crystal is zero. This is the case that will be considered in the remainder of the description. Alternatively, provision may be made for an embodiment in which in the reference configuration corresponds to a known captured amount of analyte.

The precision with which the variation $\delta\lambda$ in resonant wavelength is estimated depends on the spectral offset $d\lambda_k$ between two adjacent photonic crystals. The smaller the spectral offset $d\lambda_k$, the better the resolution with which the variation $\delta\lambda$ is estimated.

The variation in resonant wavelength $\delta\lambda$ is determined by comparing a reference image $I_{ref}$ of the resonant holder, in the reference configuration, with an image I of the resonant holder taken after capture of the analyte. The image I of the holder, after capture, is called the measurement image.

FIG. 2C shows a spectral illumination function $f$, as mentioned above. The y-axis represents the intensity $I(\lambda)$ of the illuminating light wave 11 as a function of wavelength $\lambda$. In the present case, the spectral illumination function has a maximum, comprised between the limits $\lambda_{r,min}$, $\lambda_{r,max}$ of the spectral band of resonance $\Delta\lambda_r$. Alternatively, the spectral illumination function $f$ may have a minimum in the spectral band of resonance $\Delta\lambda_r$. Irrespectively of whether it is a question of a minimum or a maximum, the extremum is preferably comprised in the middle of the spectral band of resonance $\alpha\lambda_r$. Preferably, the extremum is located between the middle $\alpha\lambda_r/2$ of the spectral band of resonance $\alpha\lambda_r$ and the maximum wavelength $\lambda_{r,max}$.

FIG. 2D shows the intensities detected in each region of interest $ROI_k$ of an image $I_{ref}$ acquired by the image sensor, in the reference configuration, in the absence of analyte capture. Each region of interest $ROI_k$ of the image corresponds to one group of pixels $32_k$ optically coupled to one photonic crystal $16_k$. Thus, each region of interest $ROI_k$ is representative of a light intensity transmitted by each photonic crystal $16_k$, at the resonant wavelength $\lambda_{ref,k}$ of the latter.

The regions of interest $ROI_k$ are distinct from one another, and aligned parallel to the photonic crystals $16_k$. In FIGS. 2D and 2F, the intensities have been represented in grayscale, the darkest grayscale level corresponding to a maximum intensity value.

FIG. 2E shows the intensities of each region of interest $ROI_k$ of an image, acquired by the image sensor, in the measurement configuration, after capture of the analyte by the photonic crystals. Each region of interest $ROI_k$ is representative of a light intensity transmitted by each photonic crystal $16_k$, at the resonant wavelength $\lambda_k$ of the latter. Under the effect of the capture of an analyte, the resonant wavelength $\lambda_k$ is different from the resonant wavelength $\lambda_{ref,k}$ with $\lambda_k = \lambda_{ref,k} + \delta\lambda$.

Comparison of the measurement image I shown in FIG. 2E, and of the reference image $I_{ref}$ shown in FIG. 2D, allows the effect of the variation in the resonant wavelength of each photonic crystal under the effect of the analyte capture to be seen.

On the basis of the measurement image and of the reference image, it is possible to form an intensity profile representative of a spatial distribution of the intensity of each region of interest $ROI_k$ along the longitudinal axis X. FIG. 2G shows a reference profile (dashed line) formed on the basis of the reference image, and a measurement profile (solid line) formed on the basis of the measurement image. Use of such profiles facilitates the comparison of two images I and $I_{ref}$ and the estimation of the variation $\delta\lambda$ in the resonant wavelength of the photonic crystals under the effect of the analyte capture. In the representation of FIG. 2G, each profile is a profile interpolated from the discrete values of the intensities of the various regions of interest $ROI_k$ of the image in question.

On account of the alignment of the photonic crystals along the same axis X, and of the small spectral offset $d\lambda_k$ between two adjacent photonic crystals, each profile has approximately the same shape as the spectral illumination function. Thus, the resonant holder 15 allows spectral information to be converted into spatial information. It acts in the same way as a spectrometer. The spatial information corresponds to a position, along the axis X, of each region of interest $ROI_k$. A spectral variation $\delta\lambda$, in the present case the variation in resonant wavelength affecting each photonic crystal, results in a spatial variation $\Delta x$ in the profile, between the reference image and the measurement image. As the spectral offset $d\lambda_k$ between two adjacent photonic crystals is set, the variation in resonant wavelength $\delta\lambda$ may be estimated, using the expression:

$$\delta\lambda = \sum_{k}^{k+\Delta k} d\lambda_k \quad (2)$$

where:
- $\Delta k$ corresponds to the spatial variation, which is obtained by comparing the measurement image and the reference image, and which represents the number of regions of interest $32_k$ forming the observed spatial variation $\Delta x$;
- $\sum_{k}^{k+\Delta k} d\lambda_k$ corresponds to the sum of the spectral offsets $d\lambda_k$ between the photonic crystals respectively associated with the regions of interest forming the observed spatial variation $\Delta x$.

Preferably, the spectral offset $d\lambda_k$ between two adjacent photonic crystals may be considered to be constant and equal to $d\lambda$. In this case, the preceding expression becomes:

$$\delta\lambda = \Delta k \times d\lambda \quad (3)$$

The advantage of using a non-uniform spectral illumination function $f$ will now be understood. It facilitates a comparison of the intensity profiles in the reference configuration and in the measurement configuration, respectively, so as to allow the number $\Delta k$ of regions of interest $ROI_k$ by which the intensity profile shifts between the reference configuration and the measurement configuration to be estimated. In the example shown in FIGS. 2D and 2E, $\Delta k = 3$. The spectral offset $d\lambda$ is known and is related to the geometry of the photonic crystals respectively associated with each region of interest, as described in the remainder of the description.

In contrast to certain prior-art devices that require a spectrometer to be used, the invention transfers the spectral splitting function to the resonant holder 15. This allows the use of a simple image sensor, which is clearly less expensive and complex to implement.

According to one embodiment, the light source is monochromatic. The spectral band of illumination may then be narrower than or equal to the spectral resonant-wavelength offset $d\lambda_k$ between two adjacent photonic crystals. In order to be able to estimate the variation $\delta\lambda$ in resonant wavelength under the effect of the capture of the analyte, the spectral band of illumination then corresponds to a resonant wavelength of a single photonic crystal in the reference configuration, i.e. in the absence of analyte capture, and in the measurement configuration.

The light source may be monochromatic and tunable, so that the spectral band of illumination may be modified.

The reference image may be an image, of the sample, acquired before the capture. In this case, the reference image is taken at an initial time, at which the capture of the analyte by the holder is considered to be negligible. It may for example be a time close to the time at which the holder and the sample are brought into contact. The measurement image is then acquired after the reference image.

Alternatively, the reference image is an image obtained with a reference holder that is considered to be representative of the holder brought into contact with the sample. The reference holder is then brought into contact with a reference sample that is considered to be representative of the analyzed sample. The reference image is stored in memory. Such an embodiment assumes a good reproducibility in the fabrication of the holders.

Thus, the reference image, taken into account to estimate the variation in resonant wavelength, may be:
  acquired by the image sensor, prior to the acquisition of the measurement image;
  or obtained using another holder, then stored in memory;
  or acquired by the image sensor, simultaneously with the measurement image, using the same resonant holder, the reference image corresponding to the image of photonic crystals configured not to capture the analyte. It is a question, for example, of non-functionalized photonic crystals. In this case, one portion of the image acquired by the image sensor forms the measurement image: this corresponds to the regions of interest of the acquired image representing the photonic crystals having captured the analyte, or, more generally, making contact with the analyte. Another portion of the image acquired by the image sensor forms the reference image: it corresponds to the regions of interest of the acquired image representing the photonic crystals not having captured the analyte, or, more generally, not making contact with the analyte. For example, the photonic crystals functionalized to capture the analyte are aligned in a first row, whereas the photonic crystals not configured to capture the analyte are aligned in a second row, the two rows being parallel to each other. The image of the first row forms the measurement image, whereas the image of the second row forms the reference image. Thus, from the same image acquired by the image sensor, the measurement image and the reference image may be obtained.

Regardless of the embodiment, the reference image is formed by illuminating the holder or the reference holder, in a spectral band of illumination $\alpha\lambda$ and according to a spectral illumination function $f$ equal to those employed to acquire the measurement image. In other words, the reference image and measurement image of the employed holder(s) are obtained under the same illumination conditions.

FIG. 2F shows a measurement image in which the amount of analyte captured by the photonic crystals is greater than the amount corresponding to the image of FIG. 2E. This results in a larger variation in index at the interface between the photonic crystals and the sample, resulting in a larger variation in resonant wavelength $\delta\lambda'$. In this image, each region of interest $ROI_k$ is representative of the intensity transmitted by the photonic crystal $16_k$ with which it is associated, at a resonant wavelength $\lambda'_k$ of the latter, with $\lambda'_k = \lambda_{ref,k} + \delta'\lambda$. In FIG. 2G, the corresponding profile is dash-dotted.

The method makes it possible to detect a presence of the analyte in the sample, this corresponding to the observation of a non-zero variation $\delta\lambda$ in resonant wavelength. It also makes it possible to estimate an amount of analyte captured by the resonant holder, with an precision depending on the number of photonic crystals and on the spectral offset $d\lambda_k$ between the resonant wavelength of two adjacent photonic crystals.

On the basis of the amount of analyte captured by the holder, it is then possible to estimate an amount of analyte in the sample, said amount possibly for example being expressed in the form of a concentration. A calibration, using samples the analyte concentration of which is known, allows a calibration function, relating the amount of analyte captured by the holder to the analyte concentration initially present in the sample, to be obtained.

FIG. 2H summarizes the main steps of the method.

Step 100: bringing the sample into contact with the resonant holder.

Step 110: illuminating the sample in the spectral band of illumination $\Delta\lambda$, according to the spectral illumination function $f$.

Step 120: acquiring a measurement image I of the resonant holder.

Step 130: taking into account of a reference image $I_{ref}$, the reference image possibly being an image of the holder acquired just after step 110, prior to the acquisition of the measurement image, this forming the optional step 115.

Step 140: comparing the measurement image I with the reference image $I_{ref}$, so as to estimate a variation in the resonant wavelength $\delta\lambda$ of the photonic crystals. It is notably a question of determining the number of photonic crystals (or the number of regions of interest) corresponding to the variation in resonant wavelength $\delta\lambda$. Knowing the spectral offset $d\lambda_k$ between the resonant wavelengths of the photonic crystals, it is thus possible to determine the variation in resonant wavelength $\delta\lambda$.

Step 150: on the basis of the comparison, determining whether the analyte addressed by the photonic crystals is present in the sample, and possibly estimating an amount of analyte in the sample.

In the example shown in FIGS. 3A to 3C, the resonant holder comprises photonic crystals $16_k$ distributed in J rows $X_1 \ldots X_j \ldots X_J$. The photonic crystals of a given row $X_j$ are configured to address a given analyte. Thus, the photonic crystals of the first row $X_1$ address a first analyte, and the photonic crystals of the $j^{th}$ row $X_j$ address a $j^{th}$ analyte. The index j is a natural integer such that $1 \leq j \leq J$.

As described with reference to the first embodiment, the photonic crystals are distributed in columns $Y_1, Y_2, Y_k, Y_K$, such that the photonic crystals belonging to two adjacent columns $Y_k$ have, in the reference configuration, the same resonant wavelength $\lambda_{k,ref}$.

This configuration, which is referred to as the two-dimensional configuration, corresponds to the addition of one dimension to the embodiment described with reference to FIGS. 2A to 2H. The added dimension corresponds to the type of analyte. Such a configuration assumes that each row has undergone a different functionalization to the others, so that each analyte may be captured by one row, and preferably by only one row. Thus, the first row $X_1$ is functionalized so as to capture a first analyte. The $j^{th}$ row $X_j$ is functionalized so as to capture a $j^{th}$ analyte, which is preferably different from the analytes addressed by the rows of lower rank.

It will be noted that the device allows a plurality of photonic crystals to be illuminated simultaneously, this making it possible to obtain exploitable information relating to various analytes from a single image acquired using a simple image sensor.

According to this embodiment, steps 100 to 150, which were described with reference to FIG. 2H, are repeated for each row $X_j$ of the holder. FIGS. 3B and 3C schematically show a measurement image and a reference image, respectively. In these figures, the light source is monochromatic. Thus, only the photonic crystal the resonant wavelength of which corresponds to the spectral band of illumination forms a high-intensity spot in the region of interest associated with it in the image acquired by the image sensor.

In the reference image (FIG. 3C), the regions of interest corresponding, in each row, to the illuminating wavelength are aligned. Comparison of the measurement image (FIG. 3B) and of the reference image reveals a large variation in the resonant wavelength of the photonic crystals of the fourth row, a smaller variation in the resonant wavelength of the photonic crystals of the first row and $3^{rd}$ row, and zero variation in the resonant wavelength of the photonic crystals of the $2^{nd}$ row. This allows it to be concluded that the first analyte, the $3^{rd}$ analyte and the $4^{th}$ analyte are present in the sample, and that the second analyte is absent. By means of calibrations carried out for each analyte, each variation in resonant wavelength allows a concentration of the analytes considered to be present in the sample to be estimated.

According to one such embodiment, the device allows the presence of various analytes in the sample to be detected simultaneously, and the concentration thereof to be estimated.

FIG. 4A shows examples of spectral reflectivity functions modeled for the same photonic crystal, successively brought into contact with three different samples, the refractive indices of which are:

1, this corresponding to the refractive index of air;
1.328, this corresponding to the refractive index of water;
1.355, this corresponding to the refractive index of ethanol;
1.464, this corresponding to the refractive index of glycerol.

Reflectivity quantifies the aptitude of a photonic crystal to reflect light that is incident thereon. It is a question of a standardized value, varying between 0 and 1, the value of 1 corresponding to complete reflection. It may be seen that each spectral reflectivity function has a minimum, which corresponds to a maximum transmission, at a very precise resonant wavelength. When the sample is water (n=1.328), the resonant wavelength is equal to 950 nm.

These simulations were carried out considering one particular embodiment, in which each photonic crystal has a structure as shown in FIG. 4B. Such a structure, referred to as the double-period structure, comprises:

first holes $23_1$, of a first radius $R_1$, and distributed according to a first periodic pattern $P_1$;
second holes $23_2$, of a second radius $R_2$ strictly smaller than the first radius $R_1$, and distributed according to a second periodic pattern $P_2$. The second periodic pattern $P_2$ is, in this example, similar to the first periodic pattern $P_1$, and offset with respect to the latter.

In this example the first periodic pattern $P_1$ and the second periodic pattern $P_2$ define a rectangular mesh, of period a along X and 2a along Y, the rectangular mesh being reproduced in two orthogonal directions of translation. In this example, the two directions of translation correspond to the longitudinal axis X and to the lateral axis Y, respectively. The first periodic pattern $P_1$ and the second periodic pattern $P_2$ are interlaced in the sense that, in one direction of translation, in the present case the Y-direction, an alternation is observed between rows of first holes $23_1$, parallel to the longitudinal axis X, and rows of second holes $23_2$, also parallel to the longitudinal axis X. In this example, the period $a_1$ (along X) of the first periodic pattern $P_1$ is equal to the period $a_2$ (along X) of the second periodic pattern $P_2$, the common period of the two patterns being denoted a. The value of the period is typically between 100 nm and 1 µm or even 2 µm. In this example, the period a is equal to 300 nm. Generally, if $\lambda$ is a wavelength belonging to the spectral band of illumination $\Delta\lambda$, the period a is comprised between $\lambda/4$ and $\lambda$.

One advantage of a double-period resonant structure is the ability to adjust a spatial offset $\delta$ between the first pattern and the second pattern. The spatial offset corresponds to a distance between the respective rows of first and second holes. FIG. 4B shows two different structures, respectively corresponding to two different spatial offsets. The spatial offset $\delta$ allows the relative position of the second pattern with respect to the first pattern to be defined. Use of two patterns that are offset with respect to each other allows a fine adjustment of the resonant wavelength. Specifically, the resonant wavelength depends on the relative position of the first and second patterns.

On the basis of the spectral functions shown in FIG. 4A, it is believed that such a double-period structure allows high quality factors, typically of the order of 1000, i.e. a full width at half maximum of the peak of 1 nm for a resonant wavelength of 1000 nm, to be obtained.

The modeled curves in FIG. 4A were obtained considering:

a first radius $R_1$ equal 100 nm;
a second radius $R_2$ equal to $0.9 \times R_1$, i.e. 90 nm;
a period a of 300 nm.
a thin-layer thickness of 58 nm.

The quality factor depends on the ratio $R_2/R_1$. When $R_2/R_1$ is of the order of 0.6 to 0.8, the quality factor is equal to a few tens. When $R_2/R_1$ tends toward 1, the quality factor rapidly increases. The quality factor may then exceed a several thousand.

Generally speaking, the first radius $R_1$ is smaller than a/2. The ratio $R_2/R_1$ is preferably higher than 0.6, or even higher than 0.8. The period a may vary between 100 nm and 1 or 2 µm, as indicated above.

FIG. 4C shows a variation in the resonant wavelength (y-axis, in nm) of various photonic crystals such as shown in FIG. 4B. In FIG. 4C, the x-axis is an identifier of each photonic crystal in question. Each double-headed arrow covers photonic crystals of the same period a, the latter varying between 288 nm and 304 nm. It may be seen that the period a influences the resonant wavelength. Points encompassed by a given period a correspond to various offsets $\delta$ between the two patterns of the photonic crystal. The spatial offset values $\delta$ in question are 0 nm, 16 nm, 23 nm, 28 nm, 33 nm and 37 nm, respectively. When the spatial offset $\delta$ is equal to 0, the distance between a second hole and each first hole adjacent thereto is equal to a. It has been estimated that a spatial offset δ of 16 nm induces a variation in resonant wavelength of 2 nm. It will be noted that the offset in resonant wavelength $dλ_k$ between two adjacent photonic crystals (spectral offset) does not vary linearly with the spatial offset δ.

Thus, another advantage of the double-period structure such as described above is to allow the resonant wavelength to be adjusted:
  by modifying the period a of the patterns, this leading to a relatively large variation in the resonant wavelength, typically 10 nm when the period a is varied by 4 nm;
  by changing the spatial offset δ of both patterns, this leading to a smaller variation in the resonant wavelength, typically 2 nm for a spatial offset δ of 16 nm, in the particular example of geometry described with reference to FIG. 4B.

The quantitative values given in the previous paragraph were obtained by modeling.

The inventors have fabricated a resonant holder so as to carry out experimental tests. The characteristics of the resonant holder were as follows:
  thin layer 22: silicon—thickness 58 nm;
  diameter D of each photonic crystal: 100 μm;
  radius $R_1$ of the first holes $23_1$: a/3
  radius $R_2$ of the second holes $23_2$: 0.9 $R_1$
  period a: variable between 288 nm and 304 nm, with period increments Δa of 4 nm.
  spatial offset δ of the first pattern with respect to the second pattern: variable between 0 nm, 16 nm, 23 nm, 28 nm, 33 nm and 37 nm. Thus, for a given period a, 6 photonic crystals were able to be obtained, each array respectively having an offset δ chosen from 16 nm, 23 nm, 28 nm, 33 nm and 37 nm.

FIGS. 5A and 5B are views from above of two examples of photonic crystals, having the same period and two different spatial offsets.

The main steps of fabrication of the photonic crystals are described below, with reference to FIGS. 6A to 6M.

Figure 6A:
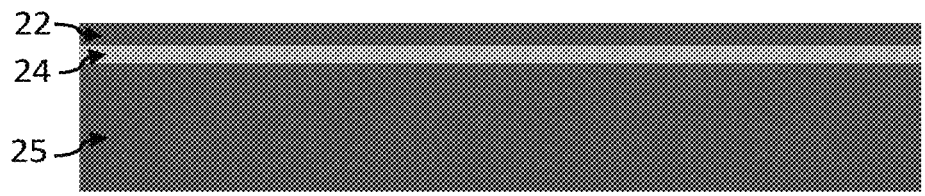

FIG. 6A shows a silicon-on-insulator (SOI) substrate, comprising an upper layer 22 of Si, of 220 nm thickness, lying on an intermediate layer 24 of $SiO_2$, called the buried oxide (BOX), of 2 μm thickness, the latter lying on a carrier layer 25 of Si of 725 μm thickness.

Figure 6B:
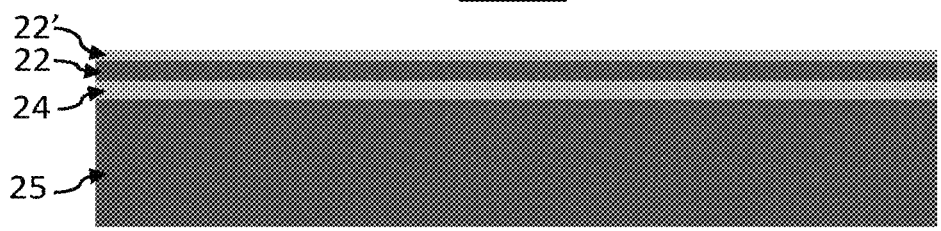

In order to obtain an upper layer 22 of Si having the desired thickness, said layer undergoes a thermal oxidation, then a chemical etch in hydrofluoric acid to remove the resulting $SiO_2$ so as to obtain a layer 22 of Si of 58 nm thickness and a layer 22' of $SiO_2$ of 80 nm thickness on the upper layer 22. This step is schematically shown in FIG. 6B.

Figure 6C:
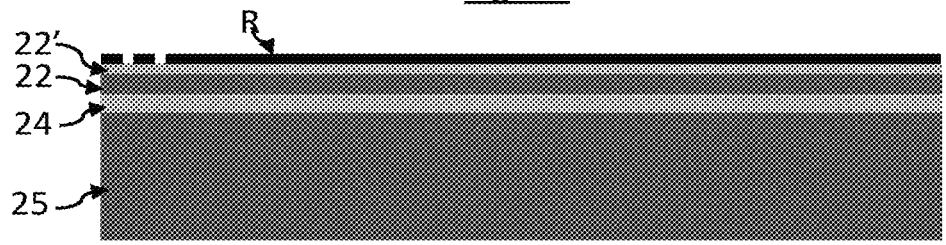
Figure 6D:
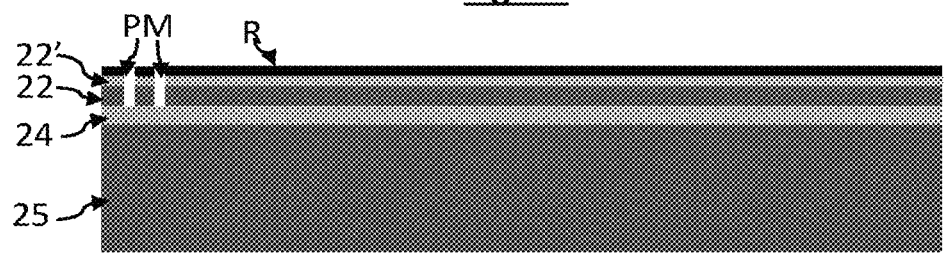
Figure 6E:
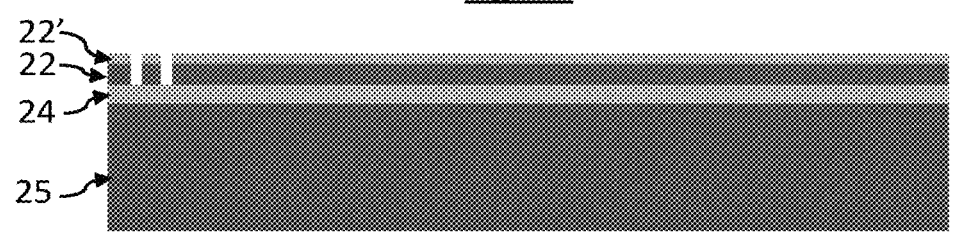

FIG. 6C schematically shows an application of a photoresist R of 570 nm thickness to the oxidized layer 22'. The resist is then exposed to UV through a photolithography mask. Following the exposure, the oxidized layer 22' and the upper layer 22 are subjected to reactive ion etching (RIE), this step being shown in FIG. 6D. This step makes it possible to form photolithography marks 19, which are referred to as first marks PM, allowing subsequent photolithography to be aligned with respect to the first marks. The resist is then removed, see FIG. 6E.

Figure 6F:
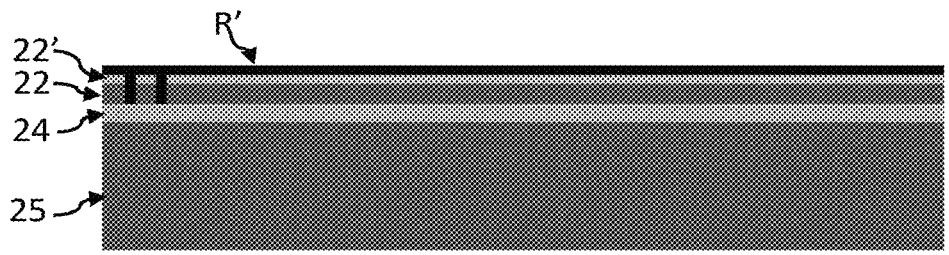
Figure 6G:
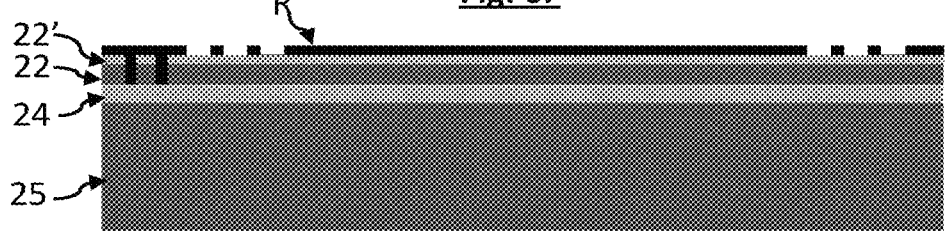
Figure 6H:
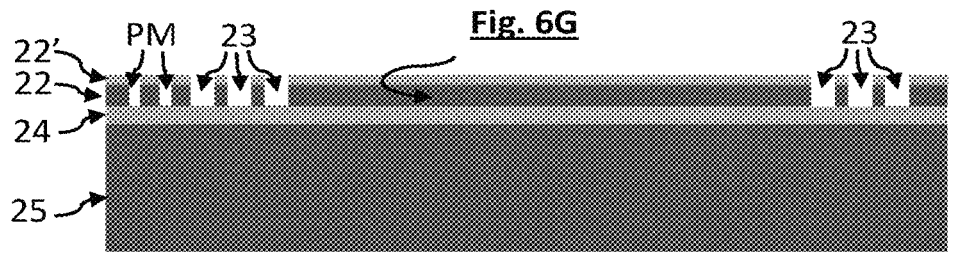
Figure 6I:

The steps shown in FIGS. 6F to 6H aim to form holes 23 in the upper layer 22, in periodic patterns such as described above, so as to form the photonic crystals $16_k$. A photoresist R', of 300 nm thickness, is deposited on the oxidized layer 22' (see FIG. 6F). The photoresist comprises a bottom anti-reflective coating (BARC). Etching regions are defined, in the resist R', via UV exposure through a mask (see FIG. 6G). The holes 23 are formed through the oxidized layer 22' and the upper layer 22 by RIE, then the resist is removed (see FIG. 6H).

Figure 6J:
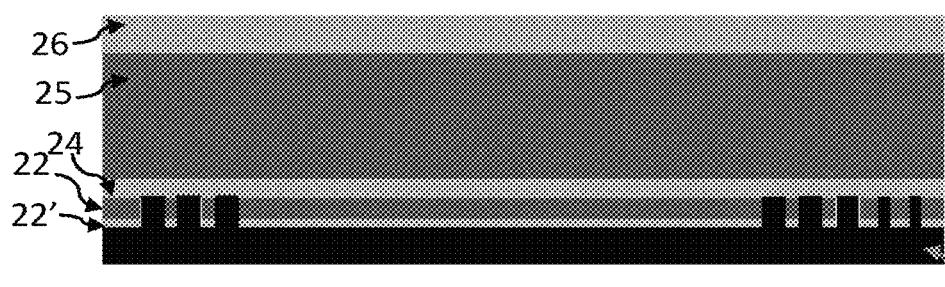
Figure 6K:
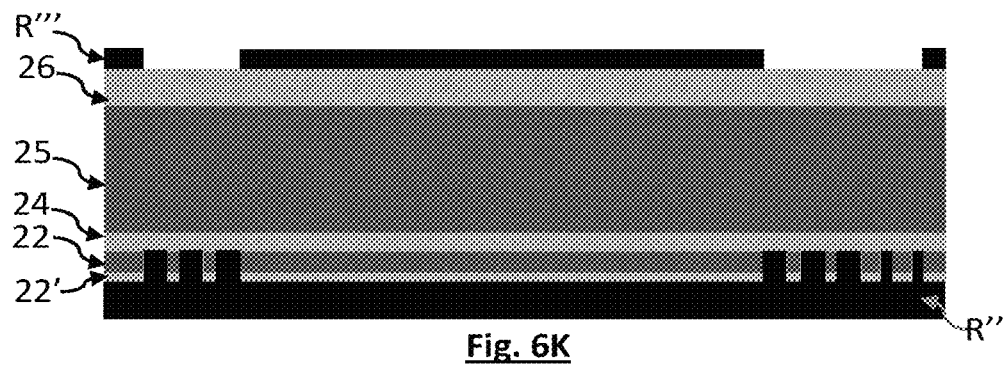
Figure 6L:
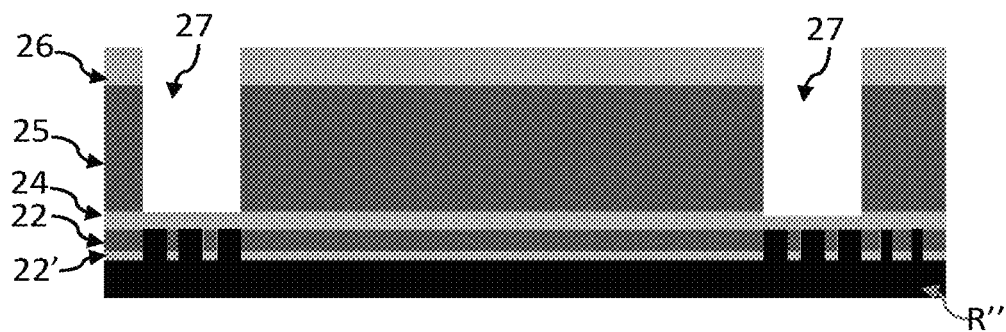
Figure 6M:
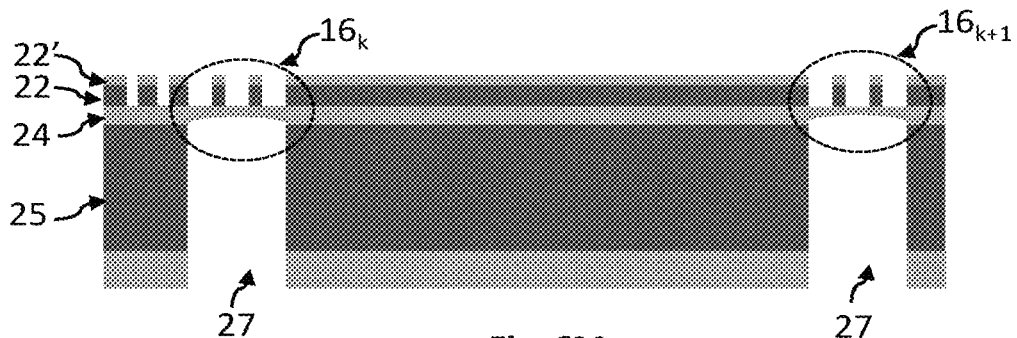

The steps shown in FIGS. 6I to 6M are steps in which the back side of the substrate is etched. A resist R" is applied to the oxidized layer 22', the thickness being 1 μm (see FIG. 6I). The applied resist allows the front side of the substrate to be protected, so as to allow the carrier layer 25 to be thinned, decreasing its thickness from 725 μm to 500 μm. The substrate is then flipped and a layer of silicon oxide 26, which acts as a hard mask, is added on the carrier layer (FIG. 6J). A resist R' is applied to the layer 26, with a thickness of 5 μm (see FIG. 6K). The resist R' is exposed through a mask, so as to define etching regions for the formation of cavities 27 in the back side of the substrate. The substrate is then etched (deep RIE) from the back side, through the carrier layer 25, the intermediate layer 24 acting as an etch-stop layer. FIG. 6L shows the step of etching from the back side. This step allows cavities to be produced facing the holes 23 formed through the layers 22 and 22'. This step allows formation of photonic crystals $16_k$ that are separate from one other, and borne by the intermediate layer 24, the latter forming a membrane below each photonic crystal. The diameter or the diagonal D of each membrane may be comprised between 50 μm and 500 μm. It is for example equal to 100 μm. The resist R" is then removed (FIG. 6M).

In the fabricating process described above, the holes 23 are formed by photolithography then etching, this allowing wafer-level fabrication of photonic crystals on the holder. Such a process makes it possible to simultaneously obtain a high number of photonic crystals, this being advantageous from an economic point of view. Alternatively, the holes may be formed by scanning with an electronic beam (e-beam), this making it possible to obtain more precise geometries, to the detriment of the cost and rate of fabrication.

Trials have been carried out to characterize the resonant holder 15 thus formed, and more precisely the photonic crystals $16_k$. To this end, a drop of water was placed on a resonant holder 15, and a glass slide of 17 μm thickness applied to confine the drop of water. A light-emitting diode centered on 940 nm was used as light source, the spectral band of illumination extending to ±40 nm with respect to the central wavelength of 940 nm. The transmission of the photonic crystals was then characterized via transmission spectrometry tests.

FIG. 7A shows a spectral transmission function of a photonic crystal. The y-axis corresponds to the percentage of light reflected by the photonic crystal, the x-axis corresponding to wavelength. A resonant wavelength below 950 nm corresponding to a Fano resonance may clearly be seen. The similarity between the modeled spectral functions in FIG. 4A and the spectral function obtained experimentally, as shown in FIG. 7A, will be noted; this confirms the validity of the modeling carried out by the inventors.

For various fabricated photonic crystals $16_k$, other tests, in fact reflectometry tests, made it possible to establish a resonant wavelength. FIG. 7B is a comparison between modeled resonant wavelengths (black dots) and experimental resonant wavelengths (gray dots). In FIG. 7B, the y-axis corresponds to wavelength (nm) whereas the x-axis designates the reference of the tested photonic crystals. Despite the presence of a substantially constant spectral offset between the modeled and measured resonant wavelengths, it may be seen that it is possible to provide a series of adjacently placed photonic crystals, in the present case 32 adjacently placed photonic crystals, between which the spectral offset $d\lambda_k$ of the resonant wavelength is on average of the order of 2 nm, between 880 nm and 940 nm.

A resonant holder comprising such photonic crystals allows a resonant wavelength to be identified in a relatively wide spectral band, of spectral width typically larger than 50 nm, and in this example of spectral width equal to 60 nm. When the photonic crystals are aligned, as shown in FIG. 2A or 3A, and coupled to an image sensor, the obtained image allows the photonic crystal transmitting a maximum light intensity to be identified. Thus, as indicated above, the device operates analogously to a spectrometer, the spectral splitting function being performed by the resonant holder 15.

FIG. 7C shows an extract from an image obtained using an image sensor, the resonant holder being placed in the configuration shown in FIG. 1A. The image of FIG. 7C shows the intensity of the light transmitted by each photonic crystal. In this example, the resonant holder is not functionalized. Thus, the photonic crystals aligned in the same column, parallel to the axis Y, produce the same spectral response. The image of FIG. 7C is interesting because it shows that, along the axis X, the intensity of the light transmitted by the various photonic crystals varies. The most intense light signal corresponds to the maximum intensity of the illuminating wave 11. This figure illustrates the ability of this arrangement of the photonic crystals to achieve a spectral discretization of the illuminating wave 11.

A holder, produced using the process described above, was integrated into a fluidic chamber 18 and subjected to use. More precisely, a removable cover made of PDMS (polydimethylsiloxane), which could be placed on the holder so as to form a fluidic chamber 18, was formed. Various liquids, notably water and ethanol, were introduced in succession into the fluidic chamber, into contact with the holder. Reflectometry trials were carried out. FIG. 7D shows the spectral reflectivity curves obtained. A variation $\delta\lambda$ in the wavelength of Fano resonance between water (in gray) and ethanol (in black) may clearly be seen.

In one advantageous configuration (shown in FIG. 8A) forming a variant of the configuration shown in FIG. 1B, an upstream polarizer $17_1$ is placed between the light source and the sample, so as to polarize the light wave propagating toward the sample in a direction not parallel to the axes of periodicity of the photonic crystals. The direction of polarization of the upstream polarizer may for example be 45° with respect to the axis Y along which the period of each photonic crystal is repeated, as shown in FIG. 8B. A downstream polarizer $17_2$ is also placed between the resonant holder and the image sensor. The direction of polarization of the downstream polarizer is oriented 90° with respect to the direction of polarization of the upstream polarizer, this allowing so-called cross-polarization detection. FIG. 8B shows, via a dashed line, the respective polarization directions of the upstream polarizer $17_1$ and of the downstream polarizer $17_2$. The addition of such polarizers allows most of the off-resonance light propagating toward the image sensor to be removed. This allows the signal-to-noise ratio of the intensity of the light propagating toward the image sensor at a resonant wavelength to be increased.

Provision may be made to use a cross polarization, combining an upstream polarizer, upstream of the sample, and a downstream polarizer, downstream of the sample, in the embodiments shown in FIG. 1A (lensless configuration) and FIG. 1C (reflection configuration).

A holder such as described with reference to FIGS. 4B and 4C has been used. FIG. 8C shows a spectrum of a light wave transmitted by a photonic crystal. FIG. 8C was produced using a spectrometer. FIG. 8C illustrates the performance, in terms of signal-to-noise ratio, obtained employing a cross polarization.

FIG. 8D shows an image of a resonant holder such as described with reference to FIGS. 4B and 4C. In this figure, the resonant holder is a matrix array, such as described with reference to FIG. 3A. No functionalization was performed. The holder is used in a cross-polarization configuration, such as described with reference to FIG. 8A. The holder is used in contact with water. A distribution of the intensity transmitted by the various photonic crystals in each row may be seen.

FIG. 8E shows a spectrum of the light source illuminating the holder. The spectrum was measured using a spectrometer. The entrance of a spectrometer was focused facing each photonic crystal of a given row. The solid circles show the obtained results. It may be seen that the wavelengths corresponding to each dot are consistent with the spectrum of the source. The rings show an intensity distribution of one row in FIG. 8D. The intensity distribution is comparable with the spectral distribution formed by the various dots. FIG. 8E illustrates the ability of a device according to the invention to convert information of spectral nature into spatial information.

FIGS. 9A to 9C illustrate an implementation of a holder such as described above, in the cross-polarization configuration. In this figure, the resonant holder is two-dimensional, as described with reference to FIG. 3A. No functionalization was carried out. Photonic crystals aligned in the same column have the same resonant wavelength. FIG. 9A shows an image of the holder placed in contact with water. As described with reference to FIG. 8C, this figure shows the ability of the device to form an image representative of the spectrum of the illuminating light wave 11. FIG. 9A thus shows the spectral illumination function $f$ discretized according to the various resonant wavelengths $\lambda_k$ of the photonic crystals $16_k$. FIG. 9B shows an image of the holder placed in contact with ethanol. It also shows the spectral illumination function $f$ discretized according to the various resonant wavelengths of the photonic crystals, said wavelengths having shifted under the effect of the variation in the index of the sample.

Because of the variation in index between water and ethanol, the wavelength of each photonic crystal undergoes a spectral variation $\delta\lambda$, in the present case a decrease, this resulting in a slight shift, to the left in the image, of the discretized spectral illumination function. FIG. 9C shows intensity profiles respectively established along a row of photonic crystals of FIG. 9A (gray) and FIG. 9B (black). These profiles allow the spectral variation $\delta\lambda$ to be observed. If FIG. 9A forms a reference image, determining the spectral variation $\delta\lambda$ allows the variation in index between water and ethanol to be estimated.

The invention will possibly be used to detect and quantify an analyte in samples, for example in the field of biological analysis or to assist with medical diagnosis. The invention may also be employed to monitor industrial processes, for example in the food industry, or even to monitor the environment.

The invention claimed is:

1. A method for detecting an analyte within a sample, the sample lying on a resonant holder, the resonant holder comprising a surface on which lie a plurality of photonic crystals, which are separate from one another, such that the sample lies between a light source and the photonic crystals, the photonic crystals being such that:

at least two of the photonic crystals are configured to make contact with the same analyte, one resonant wavelength is associated with each photonic crystal, the resonant wavelength varying as a function of an amount of analyte in contact with each photonic crystal, the resonant wavelengths of the photonic crystals defining a resonance spectral band lying between 200 nm and 1500 nm; and transmission or reflection of light by each photonic crystal is maximum at the associated resonant wavelength;

the method comprising:
a) illuminating the resonant holder with the light source in an illumination spectral band that at least partially covers the resonance spectral band, such that a plurality of photonic crystals addressing the analyte are simultaneously illuminated and an illumination intensity is variable, in the resonance spectral band, according to a spectral illumination function;
b) acquiring, with an image sensor, a measurement image of the resonant holder, the measurement image comprising different regions of interest, each region of interest being optically coupled to one photonic crystal such that each region of interest represents an intensity transmitted or reflected by each photonic crystal while the resonant holder is illuminated;
c) using a reference image, the reference image being representative of an image acquired by the image sensor, when the resonant holder is illuminated in the illumination spectral band in a reference configuration, in the absence of analyte;
d) comparing the measurement image, acquired in b), with the reference image; and
e) based on the comparison, determining whether the analyte is present in the sample, wherein each photonic crystal comprises:
first holes formed in a thin layer and having a first dimension, the first dimension being a radius or a diagonal, the first holes defining a first periodic pattern; and
second holes formed in the thin layer and having a second dimension, the second dimension being strictly smaller than the first dimension, the second holes defining a second periodic pattern;

the second pattern and the first pattern are offset with respect to each other, parallel to the surface of the resonant holder by a spatial offset, the spatial offset being variable between at least two different photonic crystals; and the resonant wavelength associated with each photonic crystal depends on the first dimension, on the second dimension, and on the spatial offset.

2. The method of claim 1, wherein a plurality of photonic crystals are aligned in a row parallel to a longitudinal axis, such that the resonant wavelength respectively associated with a photonic crystal gradually increases, or decreases, along the longitudinal axis.

3. The method of claim 2, wherein:
the resonant holder comprises rows of photonic crystals parallel to one another to form columns, parallel to a lateral axis; and
photonic crystals of a given column have a same resonant wavelength.

4. The method of claim 1, wherein:
the photonic crystals lie in a holder plane;
the light source produces an illuminating light wave; and
the illuminating light wave propagates to the resonant holder parallel to a propagation axis that is perpendicular or substantially perpendicular to the holder plane.

5. The method of claim 1, comprising, prior to a):
illuminating the resonant holder with the light source, in the illumination spectral band; and
acquiring an image of the resonant holder with the image sensor as the reference image, the amount of analyte in contact with the resonant holder being considered to be zero.

6. The method of claim 1, comprising obtaining the reference image by:
illuminating, in the illumination spectral band, a reference holder considered to be representative of the resonant holder illuminated in a), the amount of analyte in contact with the reference holder being considered to be zero; and
forming an image of the reference holder.

7. The method of claim 6, wherein:
the resonant holder comprises reference photonic crystals that are considered not to make contact with the analyte; and
the reference image is an image of the reference photonic crystals illuminated in the illumination spectral band.

8. The method of claim 7, wherein the reference image and the measurement image form two parts of the same image acquired by the image sensor.

9. The method of claim 1, wherein, for each photonic crystal addressing the analyte, the resonant wavelength depends on a refractive index of the sample, at an interface between the sample and the photonic crystal, the refractive index varying as a function of the amount of analyte making contact with the photonic crystal.

10. The method of claim 1, wherein e) comprises:
on a basis of the measurement image, determining a measurement profile of the intensity of the regions of interest associated with the analyte; and
on a basis of the reference image, determining a reference profile of the intensity, in an absence of analyte or in a presence of a known amount of analyte in the sample, of the regions of interest associated with the analyte,
wherein whether the analyte is present is determined depending on a variation in the measurement profile with respect to the reference profile.

11. The method of claim 10, wherein e) comprises estimating an amount of analyte in the sample, depending on the comparison between the measurement image and the reference image and depending on a variation in the measurement profile of the intensity of the regions of interest associated with the analyte with respect to the reference profile.

12. The method of claim 1, wherein e) comprises:
in the measurement image, determining a measurement position of a region of interest exhibiting a maximum intensity value among the regions of interest associated with the analyte; and
in the reference image, determining the reference position of a region of interest exhibiting a maximum intensity value among the regions of interest associated with the analyte,
wherein whether the analyte is present is determined depending on a variation in the measurement position with respect to the reference position.

13. The method of claim 12, wherein e) comprises estimating an amount of analyte in the sample, depending on the comparison between the measurement image and the reference image and depending on a variation in the measurement position with respect to the reference position.

14. The method of claim 1, wherein e) comprises estimating an amount of analyte in the sample, depending on the comparison between the measurement image and the reference image.

15. The method of claim 1, wherein:
the photonic crystals addressing the analyte are aligned along a longitudinal axis; and
the resonant wavelengths respectively associated with two adjacent photonic crystals are offset by a discretization pitch comprised between 1 nm and 10 nm.

16. The method of claim 1, wherein the photonic crystals addressing the analyte are covered with a functionalization layer configured to selectively capture the analyte on the photonic crystals.

17. The method of claim 16, wherein the resonant holder comprises:
photonic crystals of rank 1 configured to capture a first analyte; and
photonic crystals of rank j configured to capture a jth analyte different from analytes of rank lower than j.

18. The method of claim 1, wherein the resonant holder is disposed between the light source and the image sensor such that, in b), each region of interest formed in the measurement image is representative of an intensity transmitted by the photonic crystal to which the region of interest is optically coupled.

19. The method of claim 1, wherein:
the resonant holder bounds a half-space, comprising the light source; and
the image sensor is placed in the same half-space as the light source, such that each region of interest formed in the measurement image is representative of an intensity reflected by the photonic crystal to which the region of interest is optically coupled.

20. A device for detecting an analyte within a sample, comprising:
a light source;
an image sensor; and
a resonant holder disposed between the light source and the image sensor such that the image sensor is configured to acquire an image of the resonant holder, the resonant holder being configured to be placed in contact with a sample and the resonant holder comprising an area containing photonic crystals, which are separate from one another, wherein:
one resonant wavelength is associated with each photonic crystal, the resonant wavelengths of the photonic crystals defining a resonance spectral band lying between 200 nm and 1500 nm;
the light source is configured to simultaneously illuminate photonic crystals, in an illumination spectral band that at least partially covers the resonant spectral band;
one resonant wavelength is associated with each photonic crystal, such that transmission or reflection of the light by each photonic crystal is maximum at an associated resonant wavelength;
at least two photonic crystals are configured to make contact with the analyte, said at least two photonic crystals being associated with two different resonant wavelengths, the resonant wavelength associated with each of the at least two photonic crystals depending on an amount of analyte in contact with the respective photonic crystal;
each photonic crystal comprises:
first holes formed in a thin layer having a first dimension, the first dimension being a radius or a diagonal, the first holes defining a first pattern; and
second holes formed in the thin layer having a second dimension, the second dimension being strictly smaller than the first dimension, the second holes defining a second periodic pattern;
the second pattern and the first pattern are offset with respect to each other, parallel to the surface of the holder, by a spatial offset that is variable between at least two different photonic crystals; and
the resonant wavelength associated with each photonic crystal depends on the first dimension, on the second dimension, and on the spatial offset.

21. The device of claim 20, wherein photonic crystals configured to make contact with the same analyte are aligned parallel to the same longitudinal axis, the resonant wavelengths respectively associated with two adjacent photonic crystals being offset by a discretization pitch comprised between 1 nm and 10 nm.

22. The device of claim 21, wherein the photonic crystals configured to make contact with the analyte are configured to selectively capture the analyte.

23. The device of claim 22, wherein the resonant holder comprises
photonic crystals of rank 1 that are configured to selectively capture a first analyte; and
photonic crystals of rank j that are configured to selectively capture a jth analyte different from analytes of rank lower than j,
the width of which is preferably smaller than 200 nm, or even smaller than 100 nm or than 10 nm.

* * * * *